US011753610B2

(12) United States Patent
Mitchell

(10) Patent No.: US 11,753,610 B2
(45) Date of Patent: Sep. 12, 2023

(54) SELF HEALING CONTROLLER FOR BEER BREWING SYSTEM

(71) Applicant: PicoBrew, LLC, Seattle, WA (US)

(72) Inventor: William H. Mitchell, Medina, WA (US)

(73) Assignee: PB Funding Group, LLC, Bellevue, WA (US)

( * ) Notice: Subject to any disclaimer, the term of this patent is extended or adjusted under 35 U.S.C. 154(b) by 1138 days.

(21) Appl. No.: 16/194,428

(22) Filed: Nov. 19, 2018

(65) Prior Publication Data

US 2019/0085276 A1 Mar. 21, 2019

Related U.S. Application Data

(63) Continuation-in-part of application No. 14/660,734, filed on Mar. 17, 2015, now abandoned, which is a
(Continued)

(51) Int. Cl.
*C12C 13/00* (2006.01)
*C12C 11/00* (2006.01)
(Continued)

(52) U.S. Cl.
CPC ............ *C12C 11/003* (2013.01); *G01B 21/00* (2013.01); *G05B 17/00* (2013.01); *G05B 21/00* (2013.01);
(Continued)

(58) Field of Classification Search
None
See application file for complete search history.

(56) References Cited

U.S. PATENT DOCUMENTS

| 941,009 A | 11/1909 | Cauchois |
| 1,345,947 A | 7/1920 | Muller |

(Continued)

FOREIGN PATENT DOCUMENTS

| DE | 202012103852 U1 | 11/2012 |
| GB | 1444344 A | 7/1976 |
| WO | 2015173037 A1 | 11/2015 |
| WO | 2016057981 A1 | 4/2016 |

OTHER PUBLICATIONS

English translation of Stippler et al. German Patent Document No. DE 196 19 289, published Dec. 4, 1997.*

(Continued)

*Primary Examiner* — Bernard G Lindsay
(74) *Attorney, Agent, or Firm* — Russell Krajec; Krajec Patent Offices, LLC

(57) ABSTRACT

An automated or semi-automated beer brewing system may adjust a brewing session based on data collected during the brewing session. The adjustments may attempt to achieve a set of desired taste characteristics, even though a brewing session may then deviate from an intended recipe. A performance model of the brewing system may include taste characteristic effects and operational aspects of an automated brewing system, and may be used to calculate changes to various brewing steps. A control system may analyze various measured parameters to determine deviation from an intended recipe, and may use the performance model to calculate updated brewing steps that may attempt to achieve the desired result. When such measured parameters indicate a malfunction, a brewing session may be paused or terminated.

9 Claims, 20 Drawing Sheets

Related U.S. Application Data continuation-in-part of application No. 13/323,537, filed on Dec. 12, 2011, now Pat. No. 9,228,163.

(60) Provisional application No. 61/449,023, filed on Mar. 3, 2011.

(51) Int. Cl.
  G05B 17/00 (2006.01)
  G01B 21/00 (2006.01)
  G05B 21/00 (2006.01)
  G05B 17/02 (2006.01)
  C12C 7/20 (2006.01)

(52) U.S. Cl.
  CPC .............. C12C 7/205 (2013.01); C12C 13/00 (2013.01); G05B 17/02 (2013.01)

(56) References Cited

U.S. PATENT DOCUMENTS

| | | | |
|---|---|---|---|
| 1,832,587 | A | 11/1931 | Schneible |
| 2,145,243 | A | 1/1939 | Bagby |
| 2,547,481 | A | 4/1951 | Mcdonald |
| 2,761,200 | A | 9/1956 | Leslie |
| 2,830,528 | A | 4/1958 | Leslie |
| 3,057,726 | A | 10/1962 | Teignmouth |
| 3,102,813 | A | 9/1963 | Teignmouth et al. |
| 3,232,211 | A | 2/1966 | O'Malley |
| 3,552,436 | A | 1/1971 | Stewart |
| 3,563,157 | A | 2/1971 | Lenz |
| 3,683,790 | A | 8/1972 | Black et al. |
| 3,759,483 | A | 9/1973 | Baxter |
| 3,984,326 | A | 10/1976 | Bendel |
| 4,054,523 | A | 10/1977 | Ingenito et al. |
| 4,373,024 | A | 2/1983 | Hunt |
| 4,441,406 | A | 4/1984 | Becker et al. |
| 4,494,451 | A * | 1/1985 | Hickey .................. C12C 13/10 99/276 |
| 4,503,502 | A | 3/1985 | Chapin |
| 4,552,060 | A | 11/1985 | Redl et al. |
| 4,557,186 | A | 12/1985 | Brown |
| 4,751,875 | A | 6/1988 | Wooten, Jr. |
| 4,754,696 | A | 7/1988 | Sarazen et al. |
| 4,754,698 | A | 7/1988 | Naish |
| 4,790,239 | A | 12/1988 | Hewitt |
| 4,846,969 | A | 7/1989 | Ordelheide et al. |
| 5,158,793 | A | 10/1992 | Helbling |
| 5,265,518 | A | 11/1993 | Reese et al. |
| 5,311,811 | A | 5/1994 | Kuzyk |
| 5,413,566 | A | 5/1995 | Sevrain et al. |
| 5,865,093 | A | 2/1999 | Wasmuht et al. |
| 5,868,062 | A | 2/1999 | Enomoto |
| 5,906,151 | A | 5/1999 | Firestone et al. |
| 5,922,191 | A | 7/1999 | Mata et al. |
| 5,970,846 | A | 10/1999 | Roehr |
| 6,032,571 | A | 3/2000 | Brous et al. |
| 6,276,264 | B1 | 8/2001 | Dumm |
| 6,475,537 | B1 | 11/2002 | King et al. |
| 6,629,490 | B1 | 10/2003 | Lu et al. |
| 6,666,967 | B1 | 12/2003 | Oyabu |
| 6,952,688 | B1 * | 10/2005 | Goldman ............... G06N 5/022 706/45 |
| 7,299,824 | B2 | 11/2007 | Golan et al. |
| 7,856,602 | B2 | 12/2010 | Armstrong |
| 7,963,213 | B1 | 6/2011 | Murdock |
| 8,141,477 | B2 | 3/2012 | Broderick |
| 8,993,273 | B1 | 3/2015 | Blichmann |
| 9,102,908 | B1 | 8/2015 | Mitchell et al. |
| 9,109,192 | B1 | 8/2015 | Mitchell et al. |
| 9,228,163 | B1 | 1/2016 | Mitchell et al. |
| 9,376,653 | B1 | 6/2016 | Mitchell et al. |
| 9,688,949 | B2 | 6/2017 | Mitchell et al. |
| 9,932,547 | B2 | 4/2018 | Mitchell et al. |
| 10,138,449 | B2 | 11/2018 | Hobson |
| 2001/0035097 | A1 | 11/2001 | Shaanan et al. |
| 2002/0029694 | A1 | 3/2002 | Wong |
| 2003/0019031 | A1 | 1/2003 | Mosis |
| 2003/0097937 | A1 * | 5/2003 | Francia ................ C12G 1/0216 99/275 |
| 2003/0153059 | A1 | 8/2003 | Pilkington et al. |
| 2005/0011364 | A1 | 1/2005 | Chen et al. |
| 2005/0042337 | A1 | 2/2005 | Tarlow |
| 2005/0103213 | A1 | 5/2005 | Dumm |
| 2005/0137725 | A1 | 6/2005 | Scholl et al. |
| 2005/0160917 | A1 | 7/2005 | Gantt et al. |
| 2007/0075980 | A1 | 4/2007 | Hsieh et al. |
| 2007/0094887 | A1 | 5/2007 | Philipp et al. |
| 2008/0000357 | A1 | 1/2008 | Yang et al. |
| 2008/0282897 | A1 | 11/2008 | Webster et al. |
| 2009/0007796 | A1 | 1/2009 | Ricotti |
| 2009/0009815 | A1 | 1/2009 | Karasik et al. |
| 2009/0229471 | A1 | 9/2009 | Lun et al. |
| 2009/0246341 | A1 | 10/2009 | Pitner et al. |
| 2009/0285971 | A1 * | 11/2009 | Broderick ............... C12C 13/10 426/627 |
| 2010/0064900 | A1 | 3/2010 | Reyhanloo |
| 2010/0107887 | A1 | 5/2010 | Bentley et al. |
| 2010/0129490 | A1 | 5/2010 | Williams et al. |
| 2010/0236949 | A1 | 9/2010 | Vacca et al. |
| 2010/0313765 | A1 | 12/2010 | Hale |
| 2011/0129589 | A1 | 6/2011 | Watson et al. |
| 2011/0246091 | A1 | 10/2011 | Fedele |
| 2011/0268846 | A1 | 11/2011 | Nair et al. |
| 2012/0003623 | A1 * | 1/2012 | Bartee .................... C12M 21/12 435/286.1 |
| 2012/0040216 | A1 | 2/2012 | Parakulam |
| 2012/0132836 | A1 | 5/2012 | Cadeau et al. |
| 2012/0158173 | A1 | 6/2012 | Metropulos et al. |
| 2012/0310413 | A1 * | 12/2012 | Bluck .................... G06N 20/00 703/11 |
| 2013/0064936 | A1 | 3/2013 | Meelker et al. |
| 2013/0202487 | A1 | 8/2013 | Gorelik et al. |
| 2013/0247774 | A1 | 9/2013 | Macchiavelli et al. |
| 2014/0017354 | A1 | 1/2014 | Joseph et al. |
| 2014/0092706 | A1 | 4/2014 | Ishii |
| 2014/0110613 | A1 | 4/2014 | Pitchford et al. |
| 2014/0127372 | A1 | 5/2014 | Crosato |
| 2014/0234482 | A1 | 8/2014 | Kempfert |
| 2014/0287129 | A1 | 9/2014 | Hutcheson et al. |
| 2015/0000530 | A1 | 1/2015 | Mitchell et al. |
| 2015/0000531 | A1 | 1/2015 | Mitchell et al. |
| 2015/0000532 | A1 | 1/2015 | Mitchell et al. |
| 2015/0161871 | A1 | 6/2015 | Kim |
| 2015/0257573 | A1 | 9/2015 | Gabara |
| 2016/0075979 | A1 | 3/2016 | Mitchell |
| 2016/0137401 | A1 | 5/2016 | Heydel et al. |
| 2016/0237387 | A1 | 8/2016 | Leutz et al. |
| 2016/0272927 | A1 | 9/2016 | Mitchell |
| 2016/0272928 | A1 | 9/2016 | Mitchell |
| 2016/0348046 | A1 | 12/2016 | Wood |
| 2017/0022462 | A1 | 1/2017 | Mitchell et al. |
| 2017/0029752 | A1 | 2/2017 | Mitchell et al. |
| 2017/0051236 | A1 | 2/2017 | Mitchell |
| 2017/0051842 | A1 | 2/2017 | Francavilla |
| 2017/0130177 | A1 | 5/2017 | Geiger |
| 2017/0130178 | A1 | 5/2017 | Mitchell |
| 2017/0321810 | A1 | 11/2017 | Geiger |
| 2018/0057778 | A1 | 3/2018 | Mitchell |
| 2018/0057780 | A1 | 3/2018 | DeCaro et al. |
| 2018/0171273 | A1 | 6/2018 | Mitchell et al. |
| 2020/0010785 | A1 | 1/2020 | Monahan |
| 2020/0270556 | A1 | 8/2020 | Tull et al. |

OTHER PUBLICATIONS

Brew Your Own "Understanding Brewing Ingredients," https://byo.com/article/understanding-brewing-ingredients/, accessed Sep. 27, 2022.

HomeBrewTalk.com "Crushing Pellet Hops for Quicker Extraction," Feb. 12, 2018, https://homebrewtalk.com/threads/crushing-pellet-hops-for-quicker-extraction, accessed Sep. 27, 2022.

(56) References Cited

OTHER PUBLICATIONS

International Search Report, Intellectual Property Office of Singapore, PCT/IB2017/052677, datd Feb. 8, 2017.
Jeff Flowers, How to Raise the ABV of Your Homebrew, May 1, 2014, https://learn.kegerator.com/raising-abv/ (accessed Mar. 1, 2018), pp. 1-10.
Ken Schwartz, Son of Fermentation Chiller or, "Better Late than Never . . . ", pp. 1-14, 1997.
Vinepair, Tasting Beer—The Role of Alcohol by Volume (ABV) https://vinepair.com/beer-101/tasting-beer-the-role-of-alcohol-by-volume-abv/ (accessed Mar. 1, 2018), pp. 1-5.
Written Opinion of ISA, Intellectual Property Office of Singapore, PCT/IB2017/052677, dated Feb. 8, 2017.

\* cited by examiner

SELF HEALING CONTROLLER FOR BEER BREWING SYSTEM

CROSS REFERENCE TO RELATED APPLICATIONS

This application claims priority to and benefit of U.S. patent application Ser. No. 14/660,734 filed 17 Mar. 2015, which claims priority to U.S. patent application Ser. No. 14/485,660 filed 12 Sep. 2014, which claims priority to U.S. patent application Ser. No. 13/323,537 filed 12 Dec. 2011, which claims priority to U.S. Provisional Patent Application Ser. No. 61/449,023 filed 3 Mar. 2011, the entire contents of which are hereby specifically incorporated by reference for all they disclose and teach.

BACKGROUND

Beer making has been practiced for many years. Sugars are extracted from malted grains through a process called mashing. The sugars are boiled with hops, and the resultant wort is fermented with yeast. There are many styles of beers, each of which has is its particular character. The characteristics of a beer may be affected by many different adjustments of the mashing process, the boiling process, yeast characteristics, as well as other changes to the brewing process.

Automated or semi-automated beer brewing systems may have programmable controls for all or some portion of a brewing procedure. Some such systems may automate some or all of the mashing procedure, others may automate some or all of the boiling procedure. Such systems may include systems commonly known as recirculating infusion mash systems (RIMS) heat exchanger recirculating mash systems (HERMS), and others.

A typical characteristic of such automated or semi-automated beer brewing systems is that a programmable controller may execute a recipe program that may define a portion of the brewing process. For example, a system with automated mashing may follow a mash schedule that may heat water, add the heated water to grains, and control the temperature of the water/grain mash. In many cases, such a mashing schedule may hold at a first temperature for a designated time, adjust the temperature to a second temperature and hold for a second time, and so on. In the case of mashing, each temperature and hold time may cause certain enzymes to break down starches in the grains into different types of sugars, as well as other reactions. These reactions may cause different taste effects to occur in the resulting beer.

SUMMARY

A beer making system may modify a beer making recipe to adjust sensory characteristics of a desired beer. With a given ingredient list and starting recipe, a performance model of a brewing system may be used to generate an updated recipe when given a target set of desired sensory characteristics of a desired beer. A user interface may permit a user to adjust characteristics such as thin/thick mouthfeel, dryness/maltiness, hops bitterness, hops flavor, hops aroma, and other characteristics. An updated recipe may then change mashing schedules, boiling schedules, or other programmatically controlled aspects of a brewing system. The performance model may include standard calculations and heuristics as well as performance metrics derived from observing previous brewing sessions on one or multiple devices.

An automated or semi-automated beer brewing system may adjust a brewing session based on data collected during the brewing session. The adjustments may attempt to achieve a set of desired taste characteristics, even though a brewing session may then deviate from an intended recipe. A performance model of the brewing system may include taste characteristic effects and operational aspects of an automated brewing system, and may be used to calculate changes to various brewing steps. A control system may analyze various measured parameters to determine deviation from an intended recipe, and may use the performance model to calculate updated brewing steps that may attempt to achieve the desired result. When such measured parameters indicate a malfunction, a brewing session may be paused or terminated.

A beer making system may use a detachable vessel to contain liquid during the mashing and boiling steps, and may also be used during the fermentation steps of beer making. The beer making system may recirculate liquid through the vessel, then select between several flow paths during the beer making process. A removable reservoir system having a grain reservoir and several hops or adjunct reservoirs may be selected as a flow path, as well as a bypass flow path. A programmable controller may cause liquid to recirculate through a heater and one of the various flow paths, the sequence, timing, and temperature profile of which are defined in a recipe for a particular beer.

A beer making device may have removable reservoirs through which brewing ingredients may be added. The removable reservoir may include a grain steeping reservoir and one or more adjunct or hops steeping reservoirs. A removable tub may contain the various reservoirs, and some or all of the various ingredient reservoirs may be removable from the reservoir tub. For example, a set of hops reservoirs may be manufactured as a single joined unit, and may be removable from the reservoir tub. The removable reservoirs may include a check valve which may shut off flow when the reservoir may be removed or dislodged, thereby minimizing leakage, and a beer making device may further sense such a situation and cause operations to cease.

A cascading hops reservoir may have a series of hops or adjunct reservoirs, each having a drain and an overflow. The series of reservoirs may be used by causing flow through a first reservoir, which may cause liquid to flow through the reservoir and through the drain, as well as past an overflow. When a second set of hops or adjuncts may be added, the flow may be introduced to a second reservoir, which may flow through a drain and also overflow into the first reservoir. A series of multiple reservoirs may thus be used to introduce hops or other adjuncts into a brewing cycle in stages, with each additional stage including previous stages in the recirculating flow during the brewing cycle.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

In the drawings,

FIG. 5 is not to scale.

FIG. 6 is not to scale.

FIG. 8 is not to scale.

FIG. 10 is not to scale.

FIG. 12A is not to scale.

FIG. 12B is not to scale.

FIG. 13 is not to scale.

FIG. 14 is not to scale.

DETAILED DESCRIPTION

Figure 1:
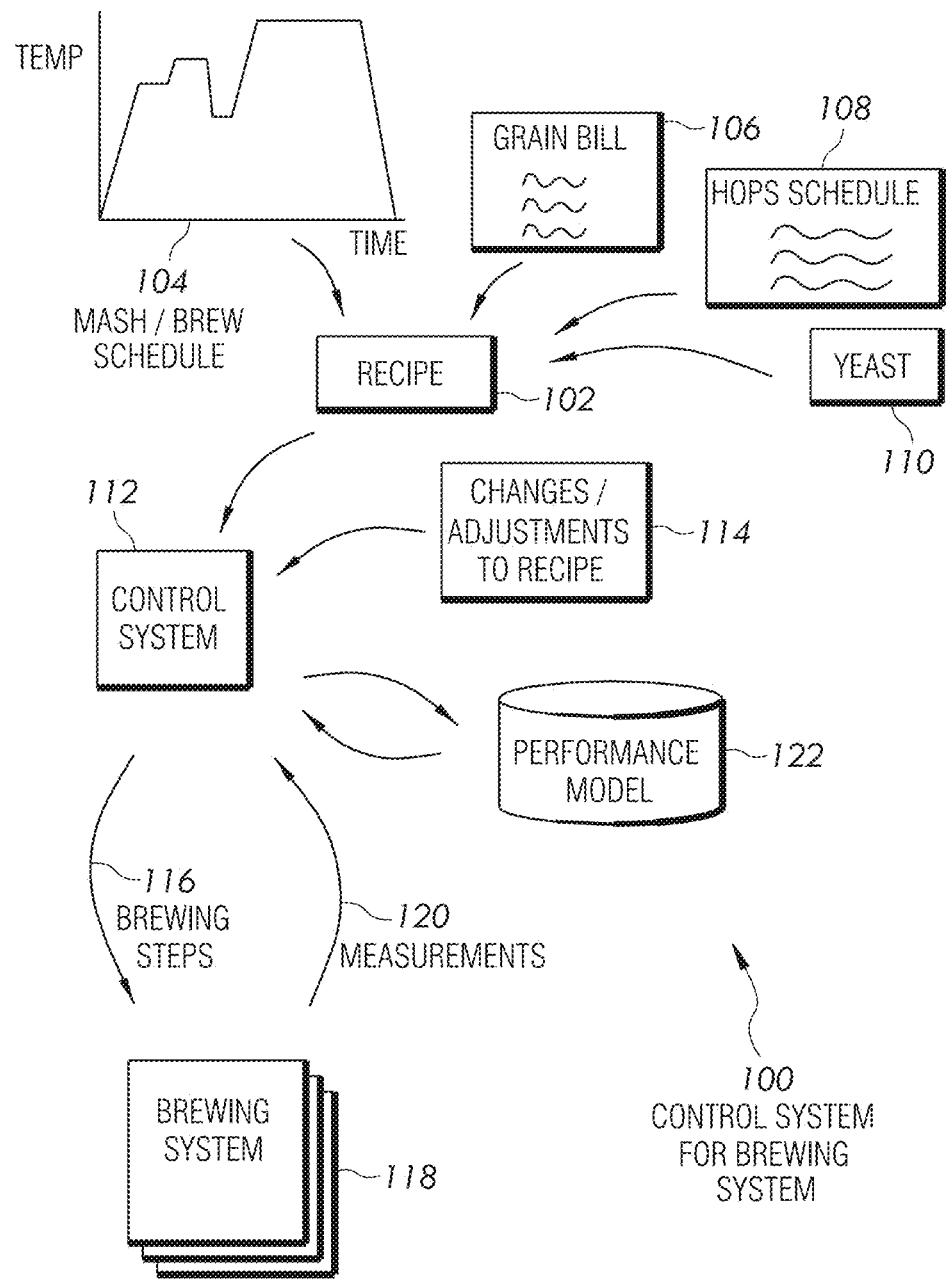
FIG. 1 is a diagram illustration of an embodiment showing control system for brewing systems.

A beer brewing system may have a programmable controller that may cause at least a portion of a beer brewing process to be automated. The programmable controller may execute a brewing recipe that may include either or both of mashing or boiling in the manufacture of wort. A recipe generator may generate brewing steps that may be executed by the programmable controller.

The recipe generator may adjust a recipe to reflect adjustments to various taste characteristics. In many cases, the recipe generator may be capable of adjusting taste characteristics given a fixed set of brewing ingredients.

For example, a user may select a baseline recipe for a type of beer. The baseline recipe may include a grain bill, hops schedule, yeast, and other ingredients to the beer. From the baseline recipe, a control system may be able to generate a set of brewing steps that, when executed, may generate the baseline beer.

The user may select adjustments to the baseline recipe through a user interface. The adjustments may include dry/maltiness, thick/thin mouthfeel, and various hops characteristics, such as bitterness, flavor, and aroma. The recipe may change various mashing steps, boiling steps, or other programmatically controlled variables to achieve the user's requested adjustments.

The adjustments may allow a user to change the outcome of a brewing session by changing the operational parameters of a brewing system without changing the ingredient list. Such a system may allow customization and personalization of a batch of beer in a simple, easy to use manner.

A recipe generator may further be used to generate multiple beer recipes from a common ingredient list. For example, a specific style of beer may be defined with a common ingredients list. Using the common ingredients list, a beer judge or other expert may attempt to match the flavor of examples of the style by changing the flavor characteristics of the baseline recipe. Using the recipe generator, drastically different beers may be generated from a starting ingredient list.

A recipe generator may use a performance model of a brewing system to calculate adjustments to brewing steps to meet a desired set of characteristics of a beer. The performance model may consist of multiple components, including heuristic and other guidelines that may be derived from human experts, as well as numerical and other measured data that may be collected from previous brewing sessions.

The performance model may include mathematical models of operational aspects of a brewing system. In a simple example, the temperature rise of brewing liquid while heating may be characterized by measuring multiple brewing sessions, with each brewing session generating several sets of measured parameters. After measuring multiple brewing sessions, a performance model of the temperature rise may be generated using regression or other statistical analysis. In some cases, the brewing sessions may be gathered from a single system or from multiple systems.

The performance model may include a model that may predict flavor characteristics based on mashing and boiling schedules. In some cases, various characteristics of beer may be defined using numerical values, such as the hops bitterness that may be defined using International Bittering Units (IBU), the Lovibond scale or Standard Reference Method (SRM) for color, original gravity (OG) or the BRIX scale for sugar content, and other factors. In many cases, these and other factors may be mathematically related to the brewing process steps in the performance model.

A control system may make changes to a brewing session by adjusting brewing steps to compensate for measured deviations from an intended brewing sequence. The control system may detect an offset from an expected measurement, then may use a performance model to calculate adjusted brewing steps. The adjusted brewing steps may be calculated to produce a similar beer to that originally intended, based on desired characteristics, including flavor characteristics.

The control system may receive measured parameters during a brewing session. When the measured parameters deviate from expected values, the control system may determine whether the deviation indicates an error condition that may prevent a successful brewing session completion. When the deviation is not determined to be an error condition, adjustments may be made to the brewing session.

The control system may enable a brewing system to produce consistent quality beers from one session to another even though there may be differences in performance during the brewing session. Such a system may ensure consistent performance from one brewing system to another when multiple systems are deployed in the field, as well as consistent performance even though a brewing system may change over time or operate under different conditions. Such a system may tolerate a large variability in hardware while still producing consistent, high quality beers.

A beer brewing system may use a recirculating liquid path with a heating mechanism and a selectable flow path to manufacture beer wort. The system may extract sugars from malted grains in a mashing phase, perform a boil phase, and cool the wort prior to fermentation. The system may use a single vessel or sump to contain the liquid through some or all of the wort manufacture phases. In some cases, the vessel may also be used for fermentation.

The beer brewing system may have a recirculating flow path with a flow selecting system. The flow selecting system may cause the recirculating liquid to pass through several different reservoirs, each of the reservoirs may contain ingredients for the wort production, such as grains, hops, or other adjuncts. The combination of multiple reservoirs plus an automated flow section mechanism may allow a recirculating beer making system to utilize a single sump or vessel.

The sump or vessel may be used as a hot liquor tun as water is being heated, as a mash tun and lauter tun during mashing and sugar extraction, as a boiling vessel during a boil phase, and the same vessel may also be used a fermentation vessel. Because hot liquid may be passed through the vessel during recirculation, the vessel may be sterilized through the wort manufacturing process, and the use of a single vessel may reduce the cost and complexity of the overall system.

A flow selecting system may cause liquid to be recirculated through different reservoirs, each of which may contain a different ingredient for the wort. The flow selecting mechanism may be programmatically controlled, and such a system may automatically control the system to manufacture wort with limited or no user interaction.

A programmable controller may control the various components of the system, including monitoring the various temperatures, controlling recirculating pump or pumps, and selecting the flow paths. A recipe may be downloaded to the controller, and the recipe may include a brewing sequence that may define a sequence of flow paths, as well as time and temperature profiles for each portion of the sequence of flow paths.

The system may have a series of reservoirs that may contain ingredients for a particular beer recipe. Such ingredients typically include malted grains, such as malted barley, rice, wheat, corn, or other grains, as well as one or more adjunct reservoirs that may contain hops and other adjuncts such as honey or other flavorings.

The reservoirs may be removable from the beer making system. Removable reservoirs may make loading, unloading, and cleaning of the reservoirs convenient and easy. The reservoirs may be loaded ahead of time and even sold or distributed as a pre-loaded unit for brewing a particular style of beer.

The reservoirs may contain a collection area and a drain, which may collect liquid that may have passed through one or more of the reservoirs. The drain may be routed to return to a sump or vessel, sometimes with the aid of a return recirculating pump. In some cases, the collection area and drain may be part of a larger removable container which may house all of the removable reservoirs. In one such case, all of the reservoirs may be removed as a single unit.

The reservoirs may include a grain reservoir, which may include hold grains while the grains are steeped in the brewing liquid as it recirculates. The liquid may begin as water that is heated to an initial mash temperature, then recirculated through the grain reservoir. As the grains steep in the recirculating liquid, the sugars may be extracted. During mashing, the temperature may be held, raised, or lowered according to a predefined mash schedule.

The liquid level in the grain reservoir or any of the other reservoirs may be controlled using a number of different designs. In one design, a sensor may be able to detect the amount of liquid in the reservoir, and an inlet pump may be controlled to increase, decrease, start, or stop pumping to maintain such a level. In another design, a sensor may be used as an input to a pump attached to the output of the reservoir, and the output pump may be controlled to increase, decrease, start, or stop pumping to maintain such a level. In both such designs, a sensor may be used as part of a feedback loop to control the liquid level in a given reservoir.

In yet another design, a reservoir may have an outlet that may be mechanically sized and positioned such that an input pump may deliver a continuous flow of liquid which may fill the reservoir and the reservoir may maintain a liquid level above the grain.

In one version of such a system, the grain reservoir may have an overflow path, where the liquid level may be maintained over a grain bed. In such a version, the grain reservoir may have a set of drain holes that may be sized to flow less liquid than a recirculating pump may deliver to the reservoir. In such a system, a recirculating pump may maintain the reservoir in an overflow condition such that the grain may remain covered with liquid while the excess overflows and may be recirculated. A similar overflow design may be used for the hops or adjunct reservoirs.

The grain reservoir may be sized to hold all of the liquid that may be in the system at any time without overflowing. Such a system may be sized to prevent leaking or overflow if a return pump fails, a blockage occurs in a return line, or some other failure occurs.

A bypass flow path may allow liquid to be recirculated from a sump or vessel, through a heating or cooling element, and be returned to the vessel. A bypass flow path may be used to heat or cool the liquid without passing the liquid through one of the various reservoirs. In many situations, a bypass flow path may be used to change the temperature of the liquid prior to some step in the brewing process. For example, a heating cycle may be used to heat the liquid prior to beginning a mashing cycle, or prior to a boiling cycle.

The system may have a heating mechanism. The heating mechanism may add heat to the liquid while the liquid recirculates. A "direct heat" type of heating mechanism may be one in which a heating element is attached to a pipe through which the liquid recirculates or where the heating element is inserted into a pipe through which the liquid recirculates. The term "direct heat" is used to differentiate from an "indirect heat" mechanism, which is one in which a heating element heats a liquid heat exchange medium, and the heated liquid heat exchange medium may apply heat to the brewing liquid through a heat exchanger. In general terms, a "direct heat" type of heating mechanism may be one in which the liquid may be scorched by possibly overheating the liquid, whereas an indirect heating system may not have the possibility of scorching the liquid.

During a boil phase of wort manufacture, the flow may be passed through one or more adjunct or hops reservoirs. Several hops reservoirs may be used to introduce hops or other adjuncts into the boil phase at predetermined times.

The construction of adjunct or hops reservoirs may have a cascading mechanism whereby liquid may be permitted to flow from one adjunct reservoir to another adjunct reservoir. Such a construction may allow adjuncts to be introduced to the recirculating flow in sequence, with the first addition being kept in the recirculating flow as a second one is added, and so forth.

A vessel may serve as a sump during some or all of the phases of wort manufacture. The vessel may contain an initial charge of water, which may be recirculated through the various reservoirs, heating mechanisms, cooling mechanisms, or other components during the wort manufacturing. In such a system, the same vessel may be used for holding liquid during mashing, boiling, cooling, and even fermenting stages of brewing. In some cases, the same vessel may also be used for conditioning and dispensing beer after fermentation.

The vessel may be removable from a brewing system. Such a configuration may allow the vessel to be used for fermentation while a second vessel may be attached to the brewing system and another batch of beer started.

Some systems may have a cooling system. A cooling system may be used to lower the temperature of the liquid during various stages of the wort manufacture, such as the final cooling prior to beginning fermentation. In some cases, the cooling system may be employed to actively drop temperature during a mash step.

Some systems may have an active cooling system, where a heat exchanger may have liquid pass through one side while chilled liquid pass through a second side of the heat exchanger. Some such systems may use tap water as the chilled liquid, while other systems may have another type of chilled liquid generator. In some cases, the wort or liquid may pass through a heat exchanger that may be immersed in ice water or some other lower temperature medium.

Some systems may have a passive cooling system that does not contain a mechanism for removing heat. An example of a passive cooling system may recirculate liquid through a bypass flow path. The recirculation may cause the liquid or wort to cool faster than if the recirculation were not performed.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

In the specification and claims, references to "a processor" include multiple processors. In some cases, a process that may be performed by "a processor" may be actually performed by multiple processors on the same device or on different devices. For the purposes of this specification and claims, any reference to "a processor" shall include multiple processors, which may be on the same device or different devices, unless expressly specified otherwise.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram illustration of an embodiment 100 showing a control system for a brewing system. A control system 112 may execute a recipe 102 with a brewing system 118. Embodiment 100 is merely one example of a system that may adjust recipes to match user adjustments, as well as to monitor and control a brewing system to meet a set of desired characteristics for a beer.

Embodiment 100 illustrates various functional elements of a beer brewing control system. The control system 112 may serve two major functions: before starting a brewing session, the control system 112 may modify various components of a recipe 102 to meet changes or adjustments 114 that a user may wish to make to the resulting beer. In a second function, the control system 112 may monitor a brewing system 118 during execution, and may make changes to various brewing steps in order to compensate for the brewing system performance yet still yield a beer with the desired qualities.

A recipe 102 may be composed of several components, including a mashing and brewing schedule 104, a grain bill 106, a hops and adjunct schedule 108, and a yeast 110. A recipe 102 may also include other adjuncts or additives, processing steps, or other components. A mashing and brewing schedule 104 is an illustration of the processing steps for grain mashing and boiling. In some embodiments, such a schedule may be separated into separate mashing and boiling schedules, depending on the automation capabilities of the brewing system.

A grain bill 106 may list the grains and adjuncts that may be present during the mashing portion of wort manufacturing. A typical grain bill may have malted barley, wheat, oats, rice, corn, or other grains, as well as adjuncts, additives, extracts, or other ingredients. In a typical mashing operation, ingredients of the entire grain bill may be added to a mashing vessel, then water may be added and the temperature controlled to break down starches in the grains into various sugars. The sugars and other components may be extracted into wort and the spent grains subsequently discarded.

A hops schedule 108 may define the hops and other additives to be used during a boil portion of wort manufacture. The hops schedule 108 may define which amounts and varieties of hops may be added at different points during a boil operation. Typically, hops for bitterness may be added early in a boil operation, flavor hops may be added in the middle, and aroma hops added at the end. The hops schedule 108 may also define other additives, such as flavor extracts, herbs, or other additives, as well as when those additives may be added to the wort.

A recipe 102 may begin with a baseline recipe to which various changes or adjustments 114 may be made. The changes or adjustments 114 may be customizations that may be made to the recipe 102 to change the characteristics of the resultant beer. A control system 112 may use a performance model 122 to calculate changes to ingredients or to the mashing and brewing schedule 104 to achieve desired characteristics of the resultant beer.

The control system 112 may transmit brewing steps 116 to a brewing system 118, which may execute the recipe 102. During execution, the brewing system 118 may take various measurements 120, which may be analyzed by the control system 112. When the measurements 120 may indicate that an error may occur, the control system 112 may cause the brewing system 118 to pause or stop operations. When the measurements 120 may indicate that the desired beer may still be attainable with modifications to the brewing steps 116, the control system 112 may update the brewing steps 116 and continue the brewing process.

The brewing system 118 may be any type of brewing system that may have a programmable controller that may execute the brewing steps 116. Some brewing systems may have controllers that monitor and control a portion of a mashing sequence, others may monitor and control a portion of the boiling sequence, and still others may monitor and control both mashing and boiling.

Figure 2:
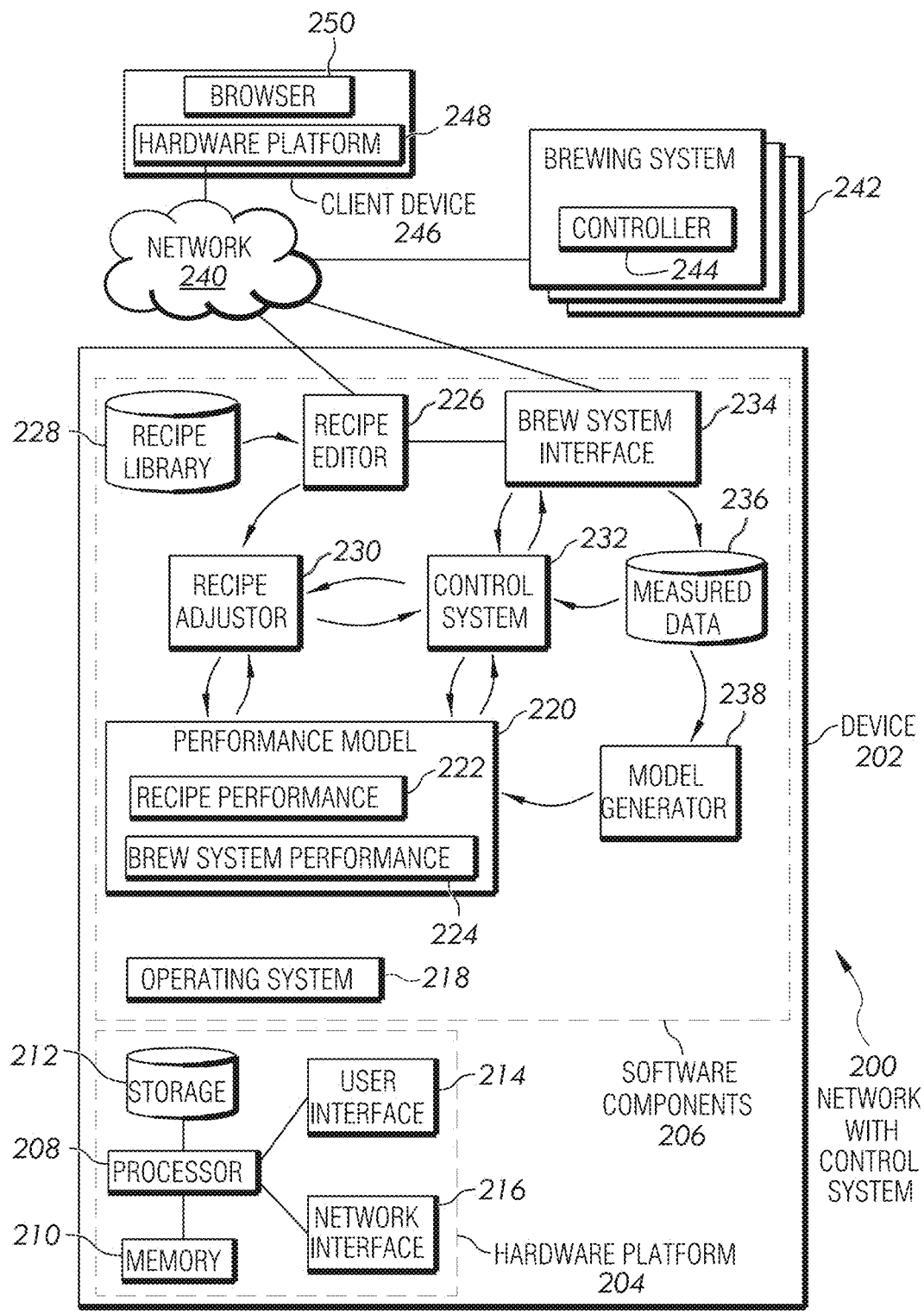
FIG. 2 is a diagram illustration of an embodiment showing a schematic or functional representation of a network with a control system.

FIG. 2 is a diagram of an embodiment 200 showing components that may manage recipes and brewing systems using a performance model. The components are illustrated as being connected across a network 240.

The diagram of FIG. 2 illustrates functional components of a system. In some cases, the component may be a hardware component, a software component, or a combination of hardware and software. Some of the components may be application level software, while other components may be execution environment level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 200 illustrates a device 202 that may have a hardware platform 204 and various software components. The device 202 as illustrated represents a conventional computing device, although other embodiments may have different configurations, architectures, or components.

In many embodiments, the device 202 may be a server computer. In some embodiments, the device 202 may still also be a desktop computer, laptop computer, netbook computer, tablet or slate computer, wireless handset, cellular telephone, game console or any other type of computing device. In some embodiments, the device 202 may be implemented on a cluster of computing devices, which may be a group of physical or virtual machines.

The hardware platform 204 may include a processor 208, random access memory 210, and nonvolatile storage 212. The hardware platform 204 may also include a user interface 214 and network interface 216.

The random access memory 210 may be storage that contains data objects and executable code that can be quickly accessed by the processors 208. In many embodiments, the random access memory 210 may have a high-speed bus connecting the memory 210 to the processors 208.

The nonvolatile storage 212 may be storage that persists after the device 202 is shut down. The nonvolatile storage 212 may be any type of storage device, including hard disk, solid state memory devices, magnetic tape, optical storage, or other type of storage. The nonvolatile storage 212 may be read only or read/write capable. In some embodiments, the nonvolatile storage 212 may be cloud based, network storage, or other storage that may be accessed over a network connection.

The user interface 214 may be any type of hardware capable of displaying output and receiving input from a user. In many cases, the output display may be a graphical display monitor, although output devices may include lights and other visual output, audio output, kinetic actuator output, as well as other output devices. Conventional input devices may include keyboards and pointing devices such as a mouse, stylus, trackball, or other pointing device. Other input devices may include various sensors, including biometric input devices, audio and video input devices, and other sensors.

The network interface 216 may be any type of connection to another computer. In many embodiments, the network interface 216 may be a wired Ethernet connection. Other embodiments may include wired or wireless connections over various communication protocols.

The software components 206 may include an operating system 218 on which various software components and services may operate.

A performance model 220 may be an expression of interactions and relationships between ingredients and processing variables that may produce beers. The expression may take many forms, including heuristics, rules, formulas, algorithms, and other expressions that may be used to determine changes to recipes and steps performed by brewing systems to meet desired characteristics of a resulting beer.

The performance model 220 may include a recipe performance model 222 that may model effects of ingredients and processing information to predict the characteristics of a beer, as well as a brew system performance model 224. Using the performance model 220, a system may be able to calculate an ingredient list and processing steps to meet a desired beer's specification and parameters.

In one use case, an ingredient list may be predetermined, and the performance model 220 may be used to calculate processing steps that may attempt to match a set of desired characteristics. An example may be that a user has a set of ingredients and may be preparing to brew a batch of beer, but the user may wish to have a thicker mouthfeel and less bitterness in the batch. The performance model 220 may be able to hold the ingredient list constant, and make adjustments to the brewing steps to achieve the user's request.

The recipe performance model 222 may be a portion of the performance model 220 that may determine effects of ingredients and processing steps to the resulting beer. The brew system performance model 224 may be a portion of the performance model 220 that may predict expected performance metrics of a given brewing system.

The brew system performance model 224 may contain a statistical model of brewing systems and may predict various performance aspects of a brewing system. Such a model may be useful to estimate performance characteristics that may be used by a recipe model to predict the characteristics of a resulting beer. In one use example, the brew system performance model 224 may predict the rate at which temperature rises or falls when heat may be added or removed from the system. Such a rate may be used to generate a mash schedule, which may be analyzed by the recipe performance model to predict beer characteristics.

The brew system performance model 224 may be used during a brewing session to determine error conditions or to make adjustments to the brewing session. The brew system performance model 224 may generate an expected system behavior, then a control system may compare the expected system behavior to an observed or measured system behavior. When there is a deviation, a control system may abort, pause, or continue the system operation. In some cases, the control system may make changes to the brewing session to attempt to meet a user's desired characteristics.

A statistical model in a brew system performance model 224 may be constructed from measurements from many brewing sessions. In some cases, the same brewing system may be used for each brewing session, while in other cases, different brewing systems may be used. When multiple brewing systems are used, the brewing systems may be identical, similar, or have widely varying characteristics. Such a statistical model may be useful to predict the performance of a new brewing system with some certainty, even though the new brewing system may not have been used before. Such a system may also be updated as new brewing sessions are captured from various brewing systems.

In some cases, a statistical model may be trained by presenting one or more examples of specific scenarios to a model generator 238 used to generate the models. For example, a scenario may include operating a brewing system with a hose disconnected, with a failing heat exchanger, or with some other condition. The model may be trained with such scenarios and may be used to identify the scenarios as they occur. Once identified, a user notification may be sent to correct the situation and continue brewing, for example.

A recipe editor 226 may be an application through which a user may select a recipe from a recipe library 228 and may edit or adjust the recipe. In some cases, the recipe editor 226 may allow a user to construct a new recipe from scratch. A typical recipe editor 226 may generate a grain bill, hops schedule, yeast selection and schedule, and other ingredients and additions. The recipe editor 226 may also generate brewing process parameters, such as a mashing schedule, boiling schedule, fermentation schedule, and other parameters.

A recipe adjuster 230 may make adjustments to a given recipe using the performance model 220. In one use scenario, a user may wish to adjust a recipe for certain flavor and taste characteristics. The recipe adjuster 230 may attempt to change the processing parameters of the recipe to meet the user's selected characteristics while keeping the ingredient list the same. The recipe adjuster 230 may generate a new set of brewing steps that may customize the recipe by controlling and operating a brewing system in a different manner. In a simple example, a user may desire a higher maltiness in a beer, and the recipe adjuster 230 may adjust the mashing schedule to increase alpha amylase extraction.

A brew system interface 234 may communicate across a network 240 to a brewing system 242. The brew system interface 234 may transmit a recipe to the brewing system 242, and the brewing system controller 244 may execute the recipe. The brew system interface 234 may receive measurements and status updates from the brewing system 242 while the recipe executes.

A control system 232 may receive status updates and measurements through the brew system interface 234. The measured data 236 may be analyzed by the control system 232 during a brewing session for anomaly detection and for making changes to a brewing session when a deviation is identified.

The control system 232 may detect anomalies during a brewing session. An anomaly may be severe, where the brewing session may be aborted. In some cases, an anomaly may be a condition where the brewing session may be paused and a user may be alerted to correct a situation. In other cases, an anomaly may be identified but the brewing session may continue. In still other cases, a control system 232 may attempt to rectify the situation by changing brewing steps to still yield a desired beer.

The brewing system 242 may be any type of brewing system with a programmable controller 244. In some cases, the programmable controller 244 may be used to control the entire brewing process, while in other cases, the programmable controller 244 may be configured to manage a subset of the brewing process. In a typical example, the controller 244 may be used to control mashing, boiling, or both mashing and boiling.

The device 202 is illustrated as a single device operating on a hardware platform. In some cases, the device 202 may be a cloud service that may provide the various operations, and a user may access such a service using a client device 246, which may have a hardware platform 248 on which a browser 250 or other application may execute. Such a client device 246 may be separate from the brewing system 242 in some cases. In other cases, the brewing system 242 may have a user interface through which the various services illustrated on device 202 may be accessed.

Figure 3:
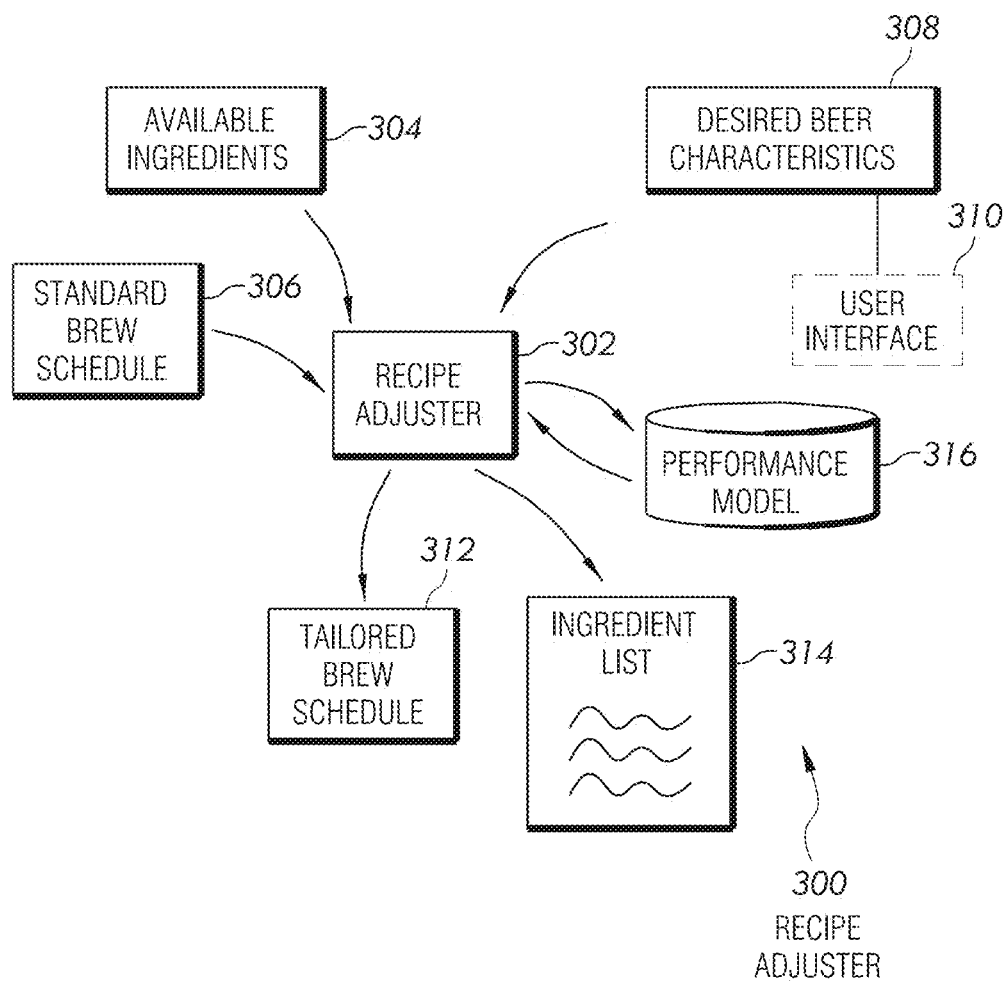
FIG. 3 is a diagram illustration of components that may make up a recipe adjuster.

FIG. 3 is a diagram illustration of an example embodiment 300 showing a recipe adjuster 302. Embodiment 300 can be used to illustrate several manners in which a recipe adjuster 302 may be used prior to brewing.

The recipe adjuster 302 may receive available ingredients 304 and a standard brew schedule 306. In a typical use case, the ingredient list and brew schedule may be defined through a recipe in a library or through a user who may use a recipe editor.

The recipe adjuster 302 may be able to determine a baseline set of beer characteristics given an ingredient list and brew schedule. The beer characteristics may be calculated using a performance model 316.

A set of desired beer characteristics 308 may be generated through a user interface 310. The desired beer characteristics 308 may be used to create a tailored or updated brew schedule 312 and, in some cases, an updated ingredient list 314.

One use scenario for a recipe adjuster 302 is to begin with a fixed ingredient list 304 and create a customized beer by varying the brew schedule 312 to meet a set of desired beer characteristics 308. Such a scenario may be implemented as a customizer for a consumer level brewing system, where a consumer may craft their beer to suit their individual tastes.

In another use case, a standard ingredient list may be used to generate several different beers. The recipe adjuster 302 may receive several different sets of beer characteristics 308, and may generate tailored brew schedules 312 for each of the sets of beer characteristics. Such a scenario may be useful when a beer judge or expert may classify three or four similar commercial beers based on their characteristics, then use a common ingredient list to generate tailored brew schedules that mimic the commercial beers. Then, a consumer may purchase a single set of ingredients and using a programmable brewing system, may be able to select from and replicate the commercial beers using the tailored brew schedules.

In still another use case, a brewer may have a certain set of available ingredients and the recipe adjuster 302 may be able to substitute the available ingredients into a recipe to generate a desired beer. For example, a brewer may have a dark roasted malt and may wish to make a recipe that may call for a medium roasted malt. The recipe adjuster 302 may be able to adjust the quantity of dark roasted malt lower and increase the quantity of another grain to achieve the desired color and taste profile of the resulting beer. The recipe adjuster 302 may also adjust the brewing parameters to achieve the desired characteristics of the resulting beer. In such an example, a brewer may be able to make a desired beer even when the precise ingredients may be not be available.

Figure 4:
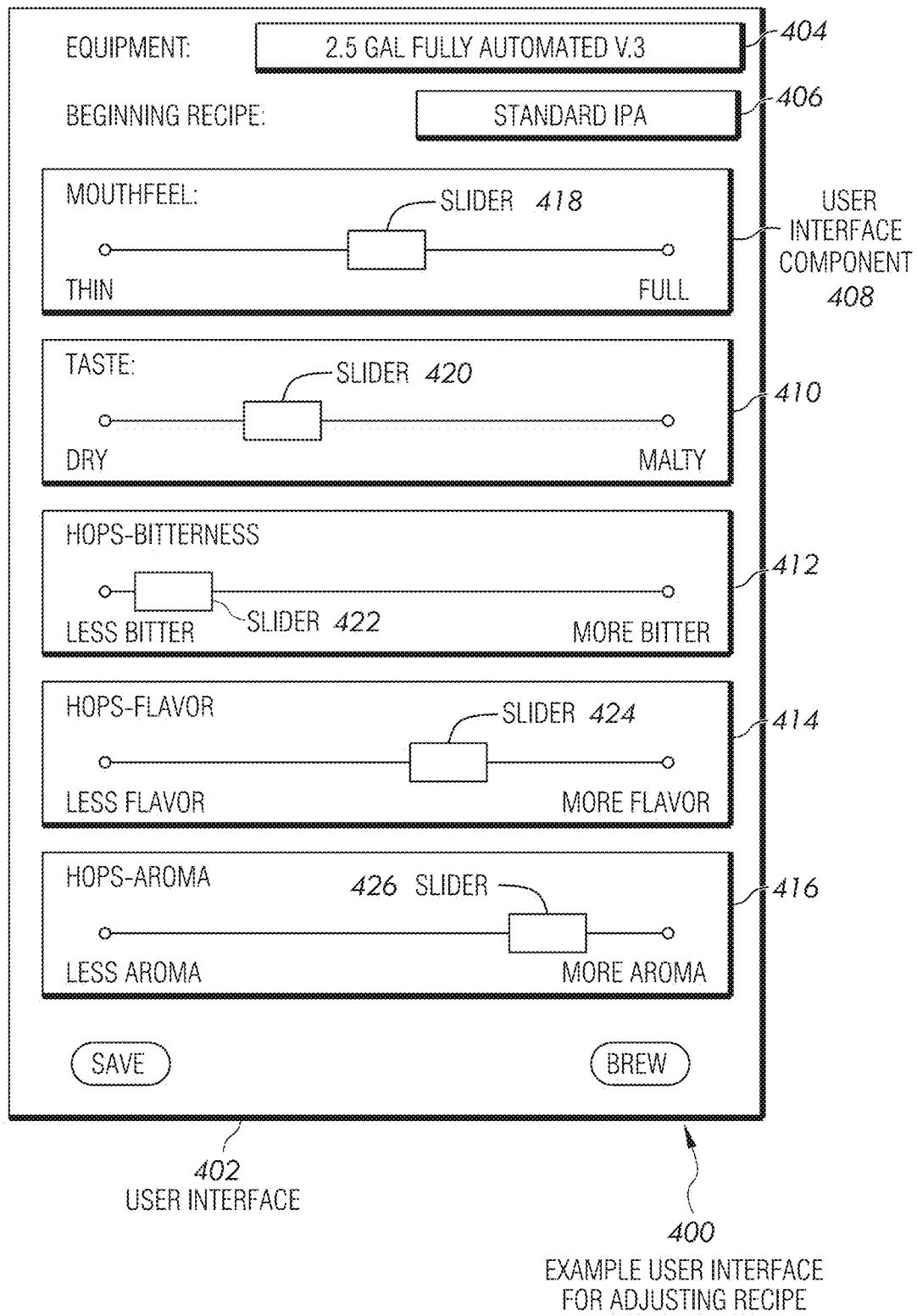
FIG. 4 is a diagram illustration of an embodiment showing an example user interface for adjusting recipes.

FIG. 4 is a diagram illustration showing an example embodiment 400 that shows an example user interface 402 through which a user may modify a brewing recipe. The user interface 402 illustrates merely one mechanism by which a user may tailor a beer to be made using a programmable brewing system.

The user interface 402 may be one mechanism by which a user may input changes to a brewing recipe, and in many cases, the changes may be implemented by changing or modifying brewing steps without modifying a set of ingredients for a batch of beer. A user may adjust various taste parameters of a beer, and a recipe adjuster may use a performance model to modify mashing schedules, boiling schedules, or make other adjustments to achieve a user's desired set of beer characteristics.

In the user interface 402, the equipment 404 and recipe 406 are illustrated. The recipe 406 may include a set of ingredients as well as a starting set of brewing steps that may make up the various brewing schedules. The user interface 402 may include a number of user interface components 408, 410, 412, 414, and 416, through which a user may adjust sliders 418, 420, 422, 424, and 426.

The example of user interface 402 contains adjustments to mouthfeel, taste, hops bitterness, hops flavor, and hops aroma. These examples are merely five examples of taste and flavor parameters that a user may adjust by changing the brewing steps using an automated brewing system.

Mouthfeel may have a user interface component 418 containing a slider 418 by which a user may be able to adjust from thin to thick. In general, mouthfeel may be affected by the amount of long chain saccharides as well as the solids in the beer. In order to increase the thickness of the beer, changes may be made to a mashing schedule to increase alpha amylase extraction. Such changes may include a section of the mashing schedule that holds the mash temperature from 156 F to 170 F, when the alpha amylase may be dominant. In order to make the beer more thin, the mashing schedule may be modified to emphasize beta amylase, which may be dominant at temperatures of 130 F to 148 F.

In some cases, changes to the mashing schedule may involve raising or lowering a single step infusion mash by a certain temperature. In other cases, changes to the mashing schedule may involve introducing multiple steps, where each step may emphasize certain reactions. Such changes may involve increasing or decreasing the time during a step, raising or lowering a step temperature, or a combination of both.

Taste adjustments from dry to malty may be adjusted using the user interface component 410 and slider 420. Maltiness or dryness may be affected by the amount of simple sugars or shorter chain saccharides, such as degree of polymerization (DP) of 4, 5, 6, or so. This may be achieved by changing the mashing schedule. For example, to make a beer with increase maltiness, the overall mashing schedule may be shortened to increase the amount of unfermentable sugars that may be present in the resulting beer. A request for increased dryness may be achieved by a longer mashing schedule that may convert more longer chained saccharides into fermentable sugars.

Hops bitterness may be adjusted through the user interface component 412 and slider 422. Hops bitterness may be adjusted by the length of time that bittering hops are in the boil schedule. By adding bittering hops later into a boil sequence, less bitterness will be imparted into the beer. By increasing the time the bittering hops are in the boil sequence, more bitterness may be induced. In general, bittering hops may be in a boil schedule for most, if not all, of the boil schedule, which may be 60-90 minutes or longer. In some cases, the boil schedule may be shorter than 60 minutes.

Hops flavor may be adjusted through the user interface component 414 and slider 424. Hops flavor may be adjusted by the length of time that flavor hops are in the boil schedule. In general, flavor hops may be added in the middle of a boil schedule, often with 10-30 minutes left in the schedule.

In general, boiling hops may add aroma and flavor initially, then as the hops remain in the boil, the aroma effects may boil off and be lost, while the flavor aspects may increase. As the boil progresses, the flavor effects may boil off and be lost as the bitterness aspects dominate the hops contribution to the beer wort.

The flavor effects of hops may be increased by keeping the flavor hops in the boil schedule for an optimum time, which may be 20-30 minutes, and may be minimized by either increasing past the optimum time or decreasing before the minimum time. Flavor hops that may be kept in the boil schedule longer than an optimum time may begin to contribute to the bitterness, while flavor hops that may be added later in the boil schedule may contribute more to aroma.

The interaction between the bittering, flavor, and aroma hops may illustrate one example where dependencies may exist between different flavor components. In many cases, certain characteristics of the resulting beer may not be independent of each other and changing one characteristic may cause another characteristic to change.

Hops aroma may be adjusted through the user interface component 402 and slider 416. Hops aroma may be adjusted by the length of time that aroma hops are present in the boil at the end of the boil process. Aroma may be decreased by increasing the time aroma hops are in the boil process past a certain point. In some cases, the aroma hops may be added after the boiling has completed and during a cooling step prior to pitching yeast and beginning fermentation.

Figure 5:
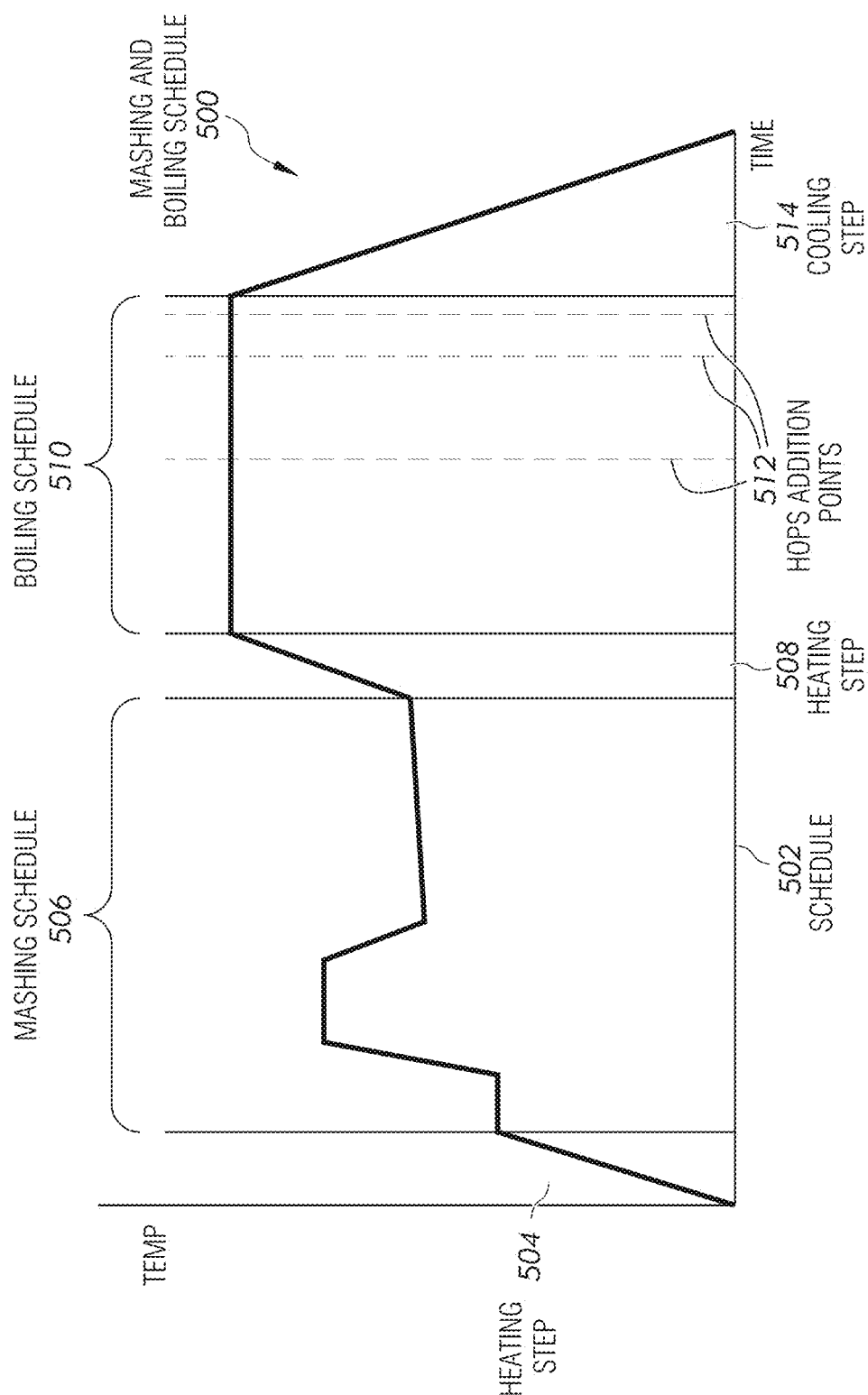
FIG. 5 is a diagram illustration of an embodiment showing a mashing and boiling schedule.

FIG. 5 is a diagram illustration of an example embodiment 500 showing a mashing and boiling schedule 502. The schedule 502 may show temperature versus time, which may reflect the temperature of the wort during production. In many systems, the wort may be transferred through various vessels, flow paths, or other processing equipment during the schedule, but such information is not illustrated here.

The schedule 502 may show a typical mashing and boiling schedule for an automated brewing system. In cases where a brewing system is configured for automatic control of both mashing and boiling, the schedule 502 may reflect the processing steps executed by the automated system. In cases where some of the brewing process is manually performed, the schedule 502 may reflect some processing steps that may be manually performed and some that may be automatically performed.

The schedule 502 may begin with a heating step 504. In many systems, the heating step 504 may involve heating water without contact between the water and grains or other ingredients.

During a mashing schedule 506, the heated water may be in contact with grains and various adjuncts, and the temperature profile may be selected to cause various enzymes to react with the starches in the grains and convert the starches into sugars.

After the mashing schedule 506, a heating step 508 may raise the wort temperature at or near the boiling temperature for a period of time. The boiling schedule 510 may keep the wort at or near the boiling point, and may include various hops addition points 512. In general, bittering hops may be added first, flavor hops added in the middle to end of the boiling schedule, and aroma hops added at the end of the boiling schedule. After completing the boiling schedule 510, a cooling step 514 may reduce the liquid temperature to a point where yeast can be pitched and fermentation begin.

Figure 6:
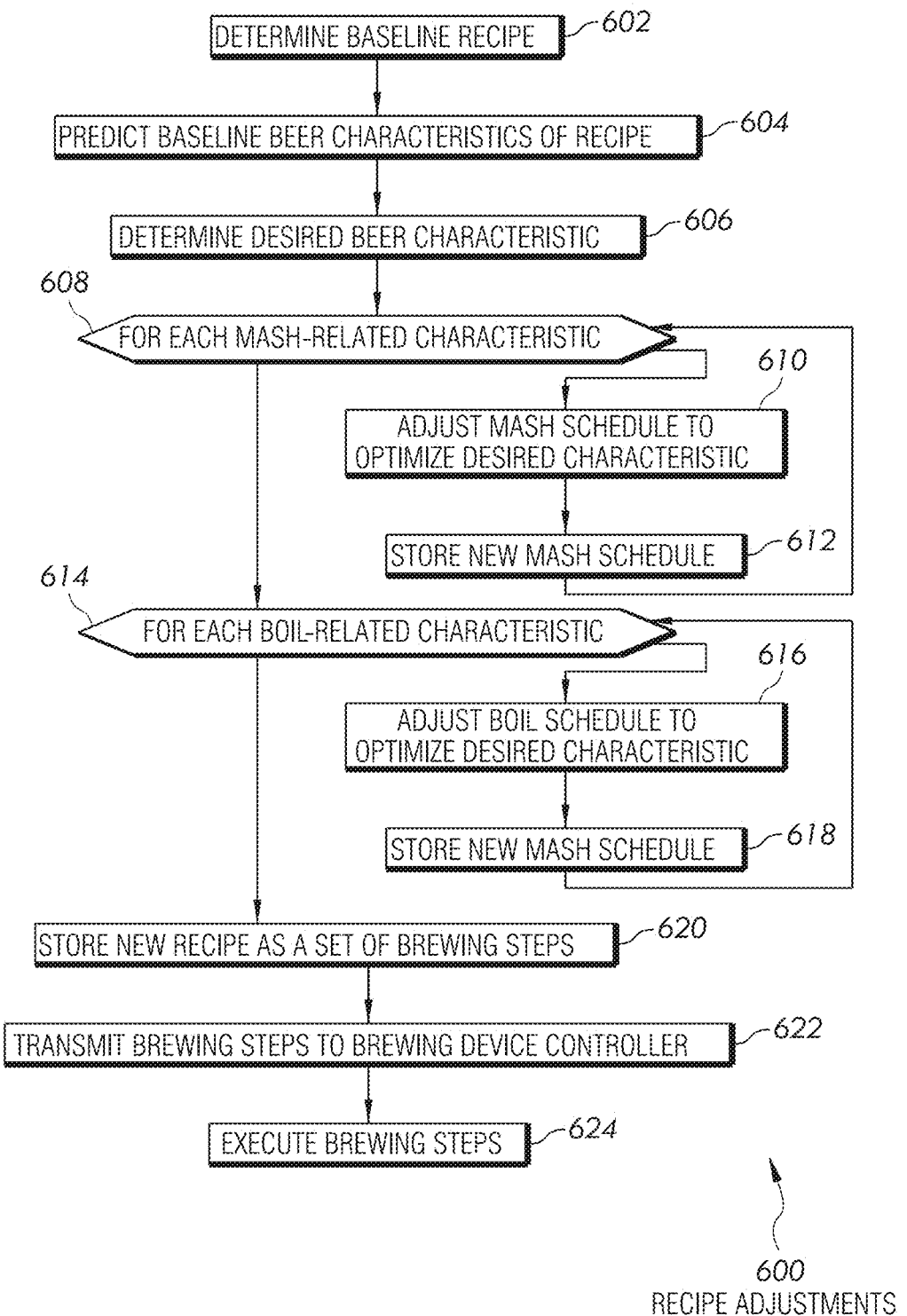
FIG. 6 is a flowchart illustration of an embodiment showing a method for making recipe adjustments.

FIG. 6 is a flowchart illustration of an embodiment 600 showing a method performed by a recipe adjuster. The method of embodiment 600 may be performed prior to executing a brewing sequence and may make changes to a brewing sequence to implement desired changes to the resultant beer given a fixed ingredient list.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 600 may illustrate a method for updating or changing a mashing schedule or boiling schedule to reflect desired changes to the resulting beer. Examples of changes to beer characteristics were discussed in embodiment 400.

A baseline recipe may be determined in block 602. In many cases, a user may select a baseline recipe as a representative recipe of a certain beer style, for example. The baseline characteristics of the beer may be predicted in block 604. The baseline characteristics may be predicted from a performance model that may calculate various characteristics, which may be beer color, sweetness, mouthfeel, bitterness, aroma, flavor, maltiness, and other characteristics.

A desired set of beer characteristics may be determined in block 606. In some cases, a user may modify a user interface such as exemplified in embodiment 400. In other cases, a beer characteristic may be received through other mechanisms, such as an application programming interface (API), for example.

For each mash-related characteristic in block 608, the mash schedule may be adjusted in block 610 to meet a desired characteristic. The new mash schedule may be stored in block 612. In the example of embodiment 600, the mash-related characteristics may be treated as independent characteristics, meaning that the various characteristics do not depend or interact with each other. In many cases, such an assumption may not be technically accurate, however, for a first order approximation, some embodiments may treat the characteristics as independent.

Similarly, for each boil-related characteristic in block 614, the boil schedule may be adjusted in block 616 to meet the desired characteristic. The new boil schedule may be stored in block 618.

The new recipe may be stored in block 620 as a set of brewing steps, which may be transmitted to the brewing system in block 622 and executed in block 624.

Figure 7:
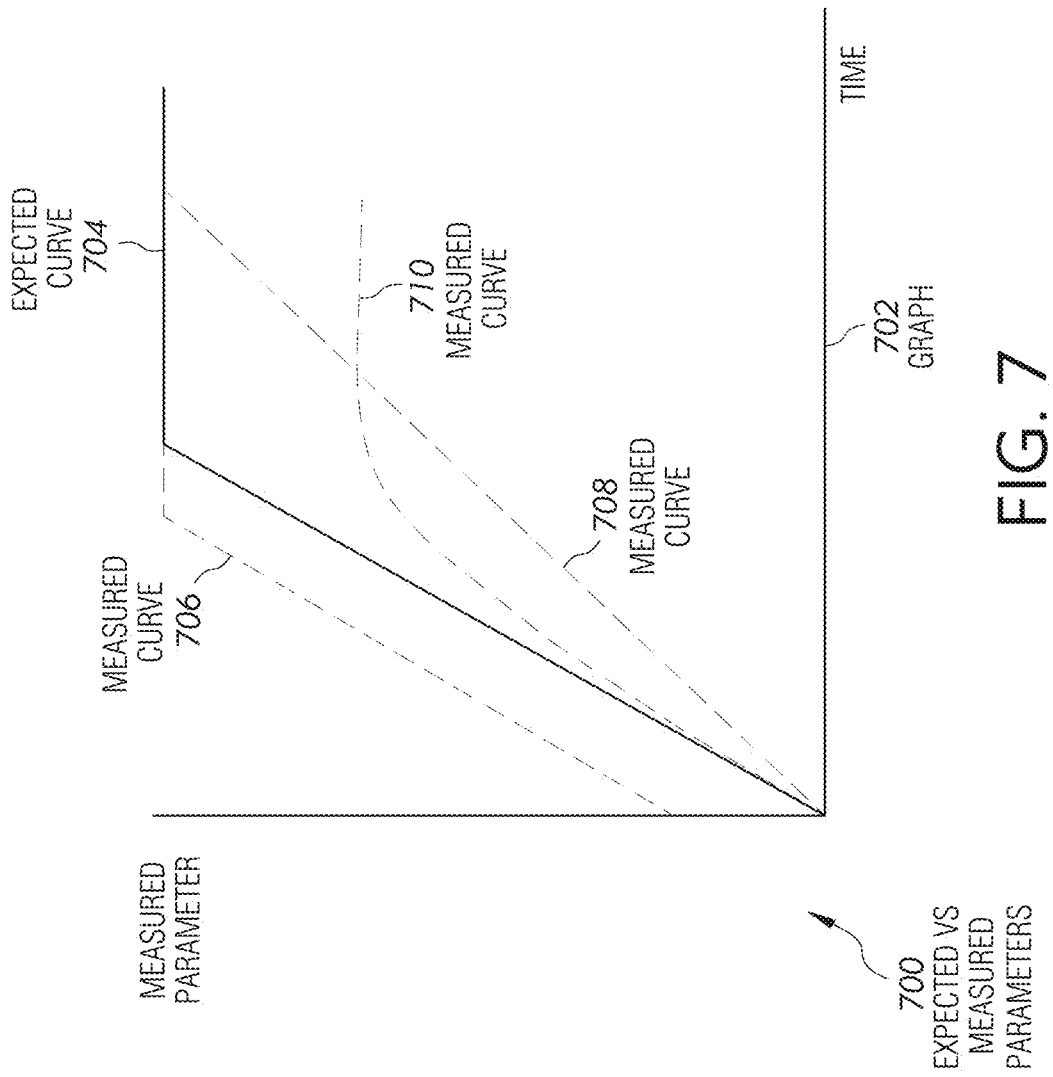
FIG. 7 is a flowchart illustration of an embodiment showing a graph of expected measured parameters.

FIG. 7 is a diagram illustration of an example embodiment 700 illustrating an expected curve 704 and various measured curves.

Embodiment 700 may graphically represent a measured parameter versus time. A measured parameter may be any parameter that an automated beer making system may produce. Examples of such parameters may include temperature, amount of heat applied, flow rates, or any other parameter. The parameters that a brewing system may be capable of measuring may be dependent on the type of brewing system and the construction and instrumentation of such a system.

In many cases, a measured parameter may be a directly measurable parameter, such as temperature. In other cases, the measured parameter may be a proxy for some other wort characteristic, such as light transmission as a proxy for amount of extracted sugar. In some cases, the measured parameter may be a first or second differential of a measured parameter, such as the rate of change of temperature or the second differential of temperature.

Regardless of the actual measured parameter, a control system may determine an expected curve 704, which may reflect the normal or expected behavior of the brewing system.

When a control system receives a measured curve representing measured data points 706, the control system may compare the measured curve 706 to the expected curve or data points 704 and determine that the two curves may be similar, and that the difference may be represented by a mathematical transformation on the expected curve 706. The control system may determine that such a transform may not adversely affect the performance of the brewing system and that the brewing system is otherwise operating normally. In such a case, the control system may continue normal operations.

When a control system receives a measured curve 708, the control system may compare the measured curve 708 to the expected curve 704 and determine that the slope of the two curves is different. The control system may evaluate the difference to determine whether or not the difference indicates an error condition or whether the remaining brewing schedule may be adjusted to compensate for the different slope. An example of such an adjustment is presented later in this specification.

When a control system receives a measured curve 710, the control system may compare the measured curve 710 to the expected curve 704 and determine that the system may have been unable to achieve the parameter value of the expected curve 704. For example, if the expected curve 704 may represent a temperature measurement, the measured curve 710 may indicate where the system was unable to achieve the desired temperature. Such a situation may occur when the system is not configured correctly, if a heating element is not functioning well, the system is not properly cleaned, or some other condition.

A performance model may be trained to recognize an improperly configured system or a system with known error conditions. For example, a brewing system may be intentionally configured with a misconfigured set of hoses. As that brewing system begins operation, a measured curve may be gathered such as measured curve 710. The performance model may be trained with several such measured curves so that a control system may be capable of identifying a poorly operating system and further identify the misconfiguration because of the similarity with the previously observed measured curves.

Figure 8:
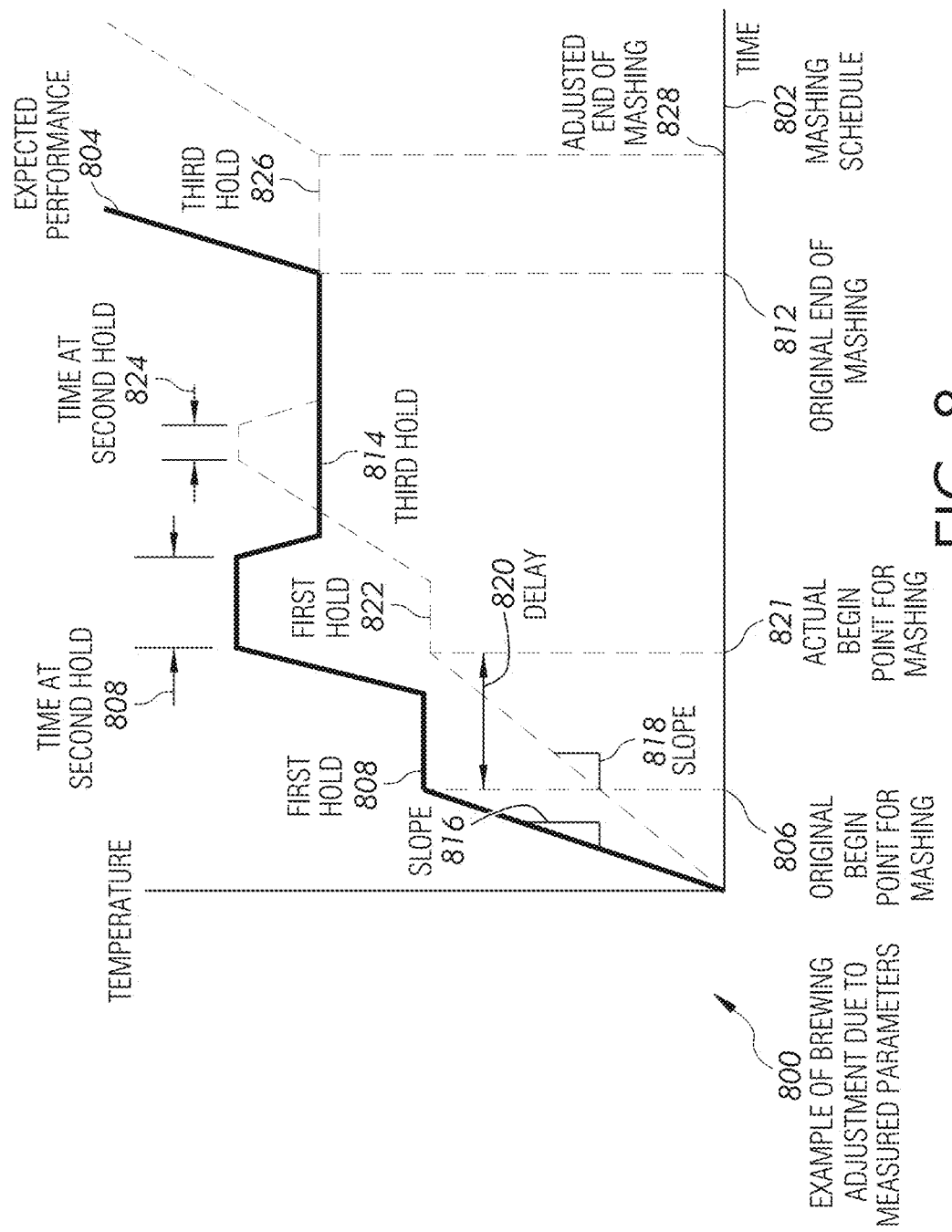
FIG. 8 is a diagram illustration of an embodiment showing an example of brewing adjustment due to measured parameters.

FIG. 8 is a diagram illustration of an example embodiment 800 showing adjustments that may be made to a mashing schedule based on measured parameters received during a brewing session. Embodiment 800 illustrates a mashing schedule 802 showing a curve exhibiting expected performance 804, measured performance, and updated changes to the brewing steps based on the measured performance.

Embodiment 800 is merely one example of how a mashing schedule may be updated to maintain desired characteristics in a resulting beer using a performance model that contains both recipe elements and brewing system performance elements.

In the example of embodiment 800, a curve showing expected performance 804 may illustrate the expected operation of a brewing system. This curve may be represented in brewing steps that may be transmitted to a brewing system and used by a processor to control the brewing system.

The expected performance 804 includes a start point for mashing 806, a first rest 808, a time at a second rest 810, an end of the mash schedule 812, which also defines a third rest 814. At the beginning of the mashing schedule, the liquid may be heated at an expected rate, and the expected rate may be defined by a slope 816.

Measured parameters during the heating phase may indicate that the actual rate of heating may be defined by the slope 818. The slope 818 may show that the system may be unable to heat liquid as fast as expected. Such a deviation from an expected value of the slope 816 may indicate that the mashing schedule may need to be adjusted.

In the example of embodiment 800, the characteristics of the resulting beer may include having a target amount of maltiness. In order to achieve the maltiness, a performance model may indicate that the overall length of time of the mashing session may be limited. The limit may ensure that the mashing process may leave some longer chain sugars in the wort, which may contribute to the maltiness of the resulting beer.

However, if the rest times of the original mashing schedule were maintained, the slower temperature rise times would cause the overall length of the mashing schedule to increase. Based on the desired characteristic of maltiness and using a performance model, the mashing schedule may be adjusted to shorten the time at the second hold 824.

The modified mashing schedule may start at a new beginning point 821, maintain a first hold 822, then transition to a second hold 824. The second hold 824 may have a reduced time from the original second hold 810 in order to maintain a desired overall length of a mashing schedule. A third hold 826 may otherwise cause the mash to end at point 828.

The example of embodiment 800 is merely one example of how a mashing schedule or brewing schedule may be updated after receiving observations about the actual performance of a brewing system. This illustration was selected to illustrate the concepts, which may be applied to many other measured parameters and many other factors that may be calculated from a performance model.

Figure 9:
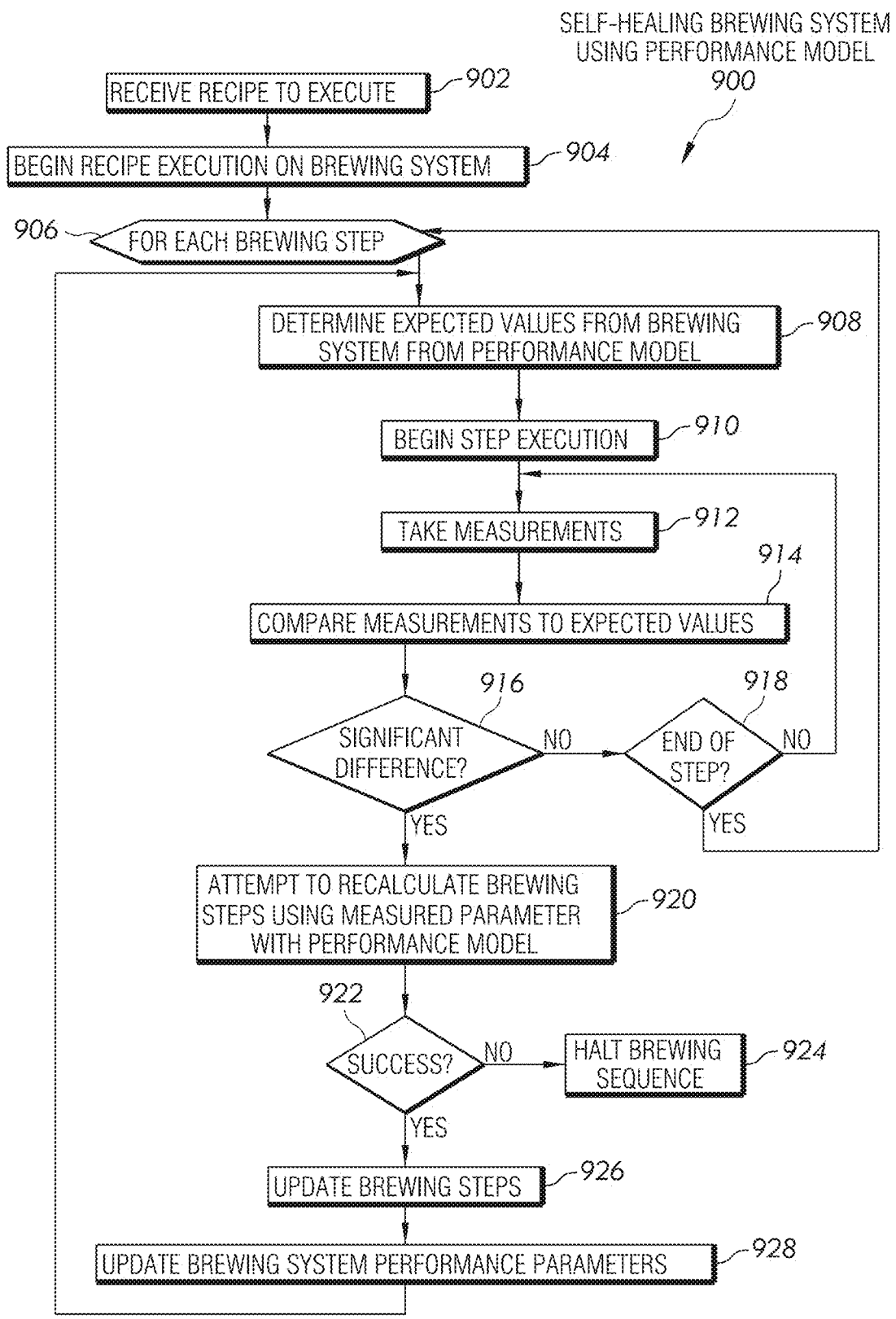
FIG. 9 is a flowchart illustration of an embodiment showing a self-healing brewing system using a performance model.

FIG. 9 is a flowchart illustration of an embodiment 900 showing a method performed by a control system where changes to brewing steps may be made during a brewing session based on measured parameters received from the brewing system.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 900 is a simplified version of a method that may be employed to manage a brewing system. An expected performance may be determined from analyzing a recipe using a performance model, then the expected performance may be compared to measured performance. When deviations occur from the expected performance, the subsequent brewing steps may be updated to maintain a set of desired characteristics in the resulting beer. Such an operation may allow a system to adapt to variations in brewing systems or external conditions yet still produce a beer with a set of desired characteristics.

A recipe may be received in block 902. A brewing system may begin execution of the recipe in block 904. Each brewing step may be analyzed in block 906.

For each brewing step in block 906, a set of expected values may be calculated from a performance model in block 908. The step may begin execution in block 910, and measurements may be taken in block 912. The measurements may be compared to the expected values in block 914. If there is no significant difference between the measured and expected values in block 916 and the end of the brewing step has not occurred in block 918, the process may loop back to step 912 to continue taking measurements during the brewing step.

If the difference between the measured and expected values is statistically significant in block 916, an attempt to recalculate subsequent brewing steps may be performed in block 918.

The recalculating of brewing steps in block 918 may attempt to determine a brewing sequence that may achieve characteristics of the resulting beer even though the brewing system is not performing as expected. When such a recalculation is successful in block 922, the brewing steps may be updated in block 926 and the expected brewing system performance parameters may be updated in block 928. The process may return to block 908 to recalculate the expected values for the current brewing step and continue executing the current brewing step.

If the recalculation in block 920 is not successful in block 922, the brewing sequence may be halted in block 924. In some cases, a user may be alerted to attend to the brewing system or to approve an override, where the user may approve the adjusted brewing sequence even though the system may not be able to achieve the desired characteristics of the resulting beer.

Figure 10:
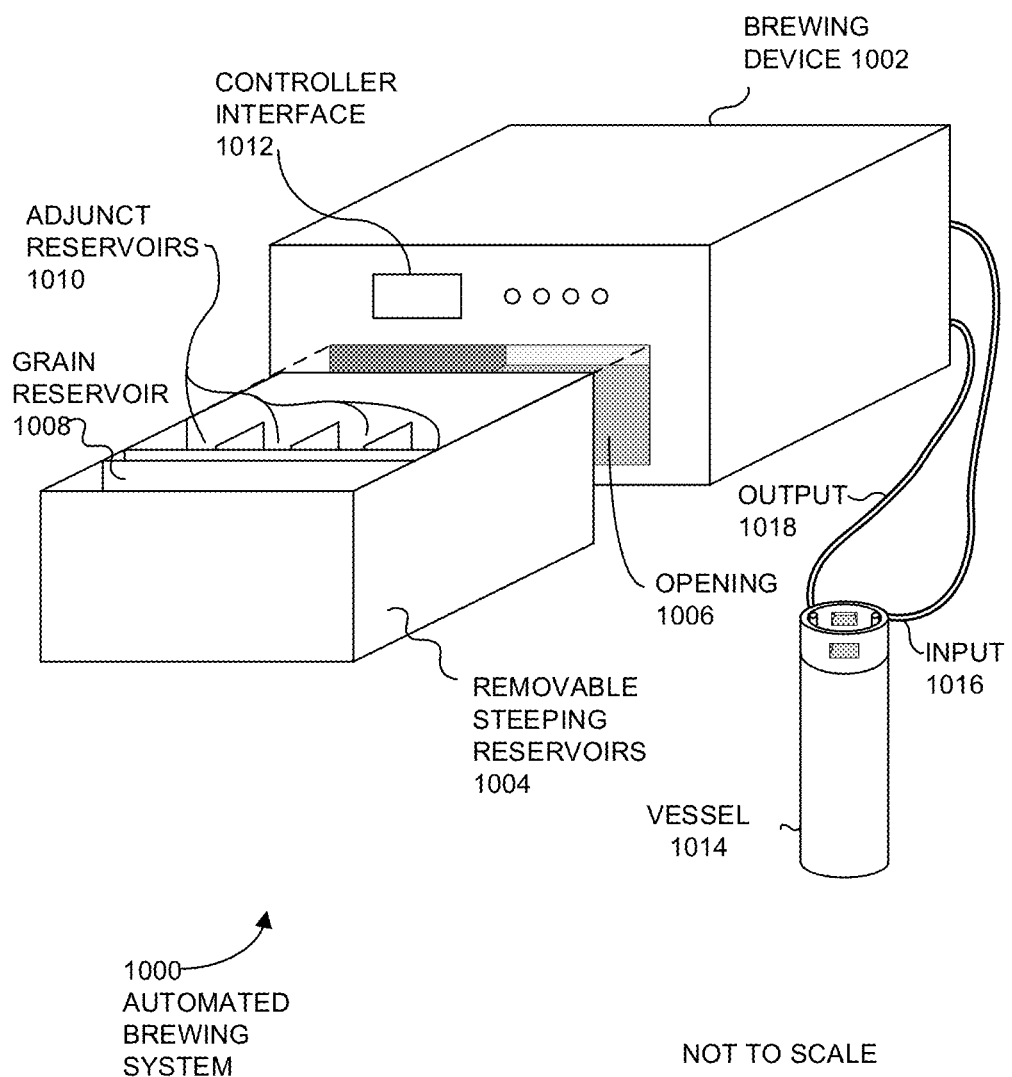
FIG. 10 is a diagram illustration of an embodiment showing an automated beer brewing system.

FIG. 10 is a diagram illustration of an embodiment 1000 showing an automated brewing system. Embodiment 1000 is merely one example of a system that recirculates liquid through multiple selectable reservoirs and a heating mechanism to manufacture wort. A programmable controller may automate the heating system and flow path selection and may be able to automatically manufacture wort with little to no user interaction.

A brewing device 1002 may have a set of removable steeping reservoirs 104 that may be inserted into an opening 1006 in the device 1002. The removable steeping reservoirs 1004 may contain grains for mashing, as well as hops or other adjunct for use during a boiling phase.

The removable reservoirs 1004 may be loaded with ingredients, then inserted into the brewing device 1002. A vessel 1014 may be pre-loaded with water at the beginning of the process, and the water may be recirculated through a heating mechanism in the brewing device 1002, as well as through the various reservoirs.

The removable steeping reservoirs 1004 may contain a grain reservoir 108, as well as multiple adjunct reservoirs 1010. The grain reservoir 1008 may be loaded with various cracked or ground grains such as malted barley, rice, corn, or other grains. The hops or adjunct reservoirs 1010 may be loaded with hops or other adjuncts such as honey, flavored extracts, or other ingredients.

The vessel 1014 may be connected to the brewing device 1002 with an input 1016 and output 1018. A recirculating flow path may pull liquid from the vessel 1014, pass the liquid through a heating mechanism, through one of the reservoirs or a bypass flow path, then return the liquid to the vessel 1014.

A controller interface 1012 may be a user interface containing input and output mechanisms for a user to interact with the brewing device 1002. Examples of the input mechanisms may include buttons, switches, touchscreens, pointing devices, or other input mechanisms. An output mechanism may include lights, buzzers, display screens, or other output mechanisms.

In some embodiments, the brewing device 1002 may be controlled by a remote device, such as a cellular telephone, tablet computer, desktop computer, or other device. In such an embodiment, the user may interact with the remote device to cause the brewing device 1002 to perform various actions.

The brewing device 1002 may have a network connection that may enable the brewing device 1002 to be programmed from various sources. For example, a server may operate a website and a user may be able to select a recipe for execution by the brewing device 1002. The recipe may be downloaded to the brewing device 1002, and then a user may cause the brewing to begin by interacting with the controller interface 1012.

Figure 11:
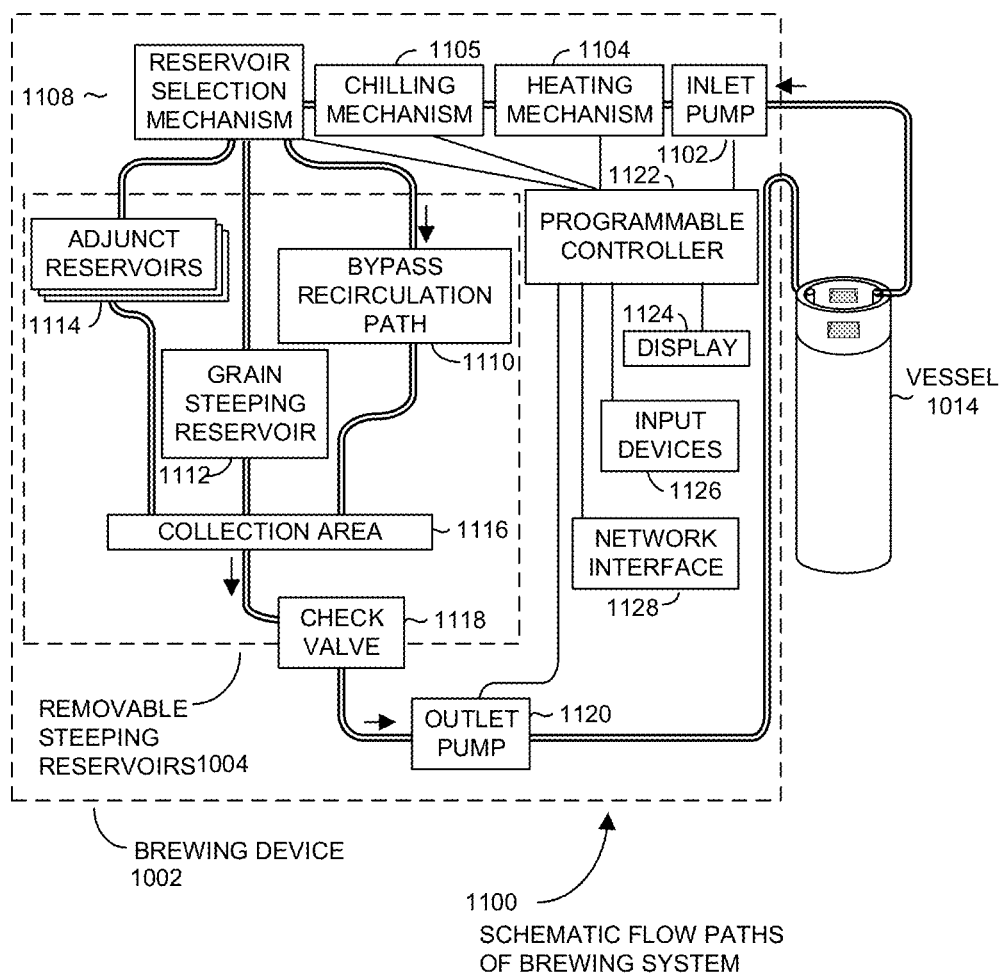
FIG. 11 is a diagram illustration of an embodiment showing a schematic or functional representation of an automated beer brewing system.

FIG. 11 illustrates an embodiment 1100 showing a functional diagram of the brewing device 1002 from embodiment 1000. Embodiment 1100 is merely one example of an automated brewing system, and other embodiments may have additional or fewer components, or may have the components arranged in a different manner.

The diagram of FIG. 11 illustrates functional components of a system. In some cases, the component may be a hardware component, a software component, or a combination of hardware and software. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 1100 may illustrate the brewing device 1002, removable steeping reservoirs 1004, and vessel 1014 as shown in embodiment 1000.

The recirculating flow of liquid may be pulled from the vessel 1014 through an inlet pump 1102 and through a heating mechanism 1104 and an optional chilling mechanism 1105. The liquid may flow through a reservoir selection mechanism 1108 and through one or more flow paths, which may consist of a bypass circulation path 1110, a grain steeping reservoir 1112, and one or more hops or adjunct reservoirs 1114. The output of the various flow paths may pass through a collection area 1116 and a check valve 1118 before leaving the removable steeping reservoirs 1004. An outlet pump 1120 may draw liquid from the reservoirs 1004 and back to the vessel 1014.

A programmable controller 1122 may control the inlet pump 1102, outlet pump 1120, as well as the heating mechanism 1104, chilling mechanism 1105, and the reservoir selection mechanism 1108. The programmable controller 1122 may have a display 1124, input devices 1126, and a network interface 1128.

The reservoir selection mechanism 1108 may direct the recirculating flow through one or more of the various reservoirs or the bypass flow path. The reservoir selection mechanism 1108 may be implemented as a moving tube that may be positioned over one of the flow paths to select the flow path. The recirculating liquid may be dispensed into the flow path.

The reservoir selection mechanism 1108 may be implemented in many different manners. In one design, a moving arm may be positioned over a selected reservoir using a stepper or servo motor. A sensor or sensors may be used to detect when the moving arm may be in one or more known positions, and a feedback loop may be used to control the position of the moving arm.

In another design, the flow output may be positioned over a selected reservoir using an X-Y stage. In one such design, an output tube may be positioned over a selected flow path using independently controlled X and Y actuators. Such a design may be useful to dispense liquid over a large reservoir by moving back and forth during recirculation, thereby spreading the recirculating liquid more evenly across a reservoir than when a dispensing tube is positioned in a single location. Other designs may also include a mechanism to move a dispensing tube over a reservoir during recirculation.

In still another design, the flow may pass through a manifold that may have outlets over each of the various reservoirs and individually controlled valves for each reservoir. In such a design, a programmable controller may select one or more reservoirs for flow, and select the corresponding valves to be open and other valves to be closed. Such a design may allow multiple flow paths to be open at any given time.

The output of the various reservoirs or bypass recirculation path may collect in a collection area 1116. The collection area 1116 may be a portion of the removable steeping reservoirs 1004 where the outflow of the reservoirs may gather. A check valve 1118 may be located at an exit to the reservoirs 1004 so that any liquid in the reservoirs 1004 may not spill when the reservoirs 1004 are removed from the brewing device 1002.

A safety mechanism may detect when the reservoirs 1004 are removed or dislodged from the device 1002. The detection may be made with a sensor, switch, or other mechanism by which the programmable controller 1122 may detect that the reservoirs 1004 are not positioned properly. When a detection is made that the reservoirs 1004 are not positioned properly, the programmable controller 1122 may shut down the inlet pump 1102 to prevent further liquid from being dispensed from the reservoir selection mechanism 1108 and, due to the incorrectly positioned reservoirs 1004, may spill from the device 1002.

The check valve 1118 may be constructed to close when the reservoirs 1004 are removed from the device 1002 and may be open when the reservoirs 1004 are fully seated in the device 1002. In one such design, a check valve may be spring loaded to open when the reservoirs 1004 are fully seated but remain closed when not fully seated.

The inlet pump 1102 and outlet pump 1120 may be controlled in different manners. In one manner, both the inlet pump 1102 and outlet pump 1120 may be controlled to be either on or off. In another manner, one or both of the pumps may be variable controlled, such that the programmable controller 1122 may be able to increase or decrease the flow.

The outlet pump 1120 may be configured to flow more liquid than the inlet pump 1104. Such a design may be useful to prevent liquid from collecting in the reservoirs 1004. In one version of such a design, the inlet pump 1102 may be run less frequently than the outlet pump 1120, thereby minimizing the opportunity for excess liquid to collect in the reservoirs 1004.

Embodiment 1100 illustrates a system with two pumps, one on the inlet size and one on the outlet side. In some embodiments, one of the pumps may not be present and gravity may be used. For example, the vessel 1014 may be placed above the brewing device 1002 and the inlet flow path may be gravity fed. In another example, the vessel 1014 may be placed below the brewing device 1002 and the outlet flow path may be gravity fed.

Embodiment 1100 illustrates a system where the heating mechanism 1104 and chilling mechanism 1105 are located upstream from the reservoirs. Other embodiments may have one or both of the heating mechanism 1104 and chilling mechanism 1105 after the reservoirs 1004 and prior to returning flow to the vessel 1014.

The chilling mechanism 1105 is illustrated as a separate device from the heating mechanism 1104. Some embodiments may have a single mechanism that may be capable of actively heating and chilling the recirculating liquid.

Figure 12A:
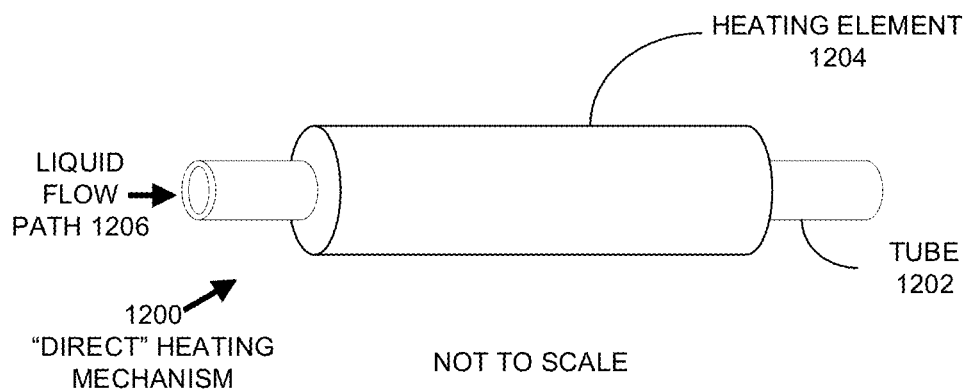
FIG. 12A is a diagram illustration of an embodiment showing a "direct" heating mechanism.

FIG. 12A is an example embodiment 1200 showing a "direct" heating mechanism. FIG. 12A is not to scale.

Embodiment 1200 may illustrate a tube 1202 and a heating element 1204. The liquid flow path 1206 may cause liquid to flow through the tube 1202, and the heating element 1204 may apply "direct" heat to the tube 1202. The heating element 1204 may be an electrical element, gas flame, or other heat source.

Figure 12B:
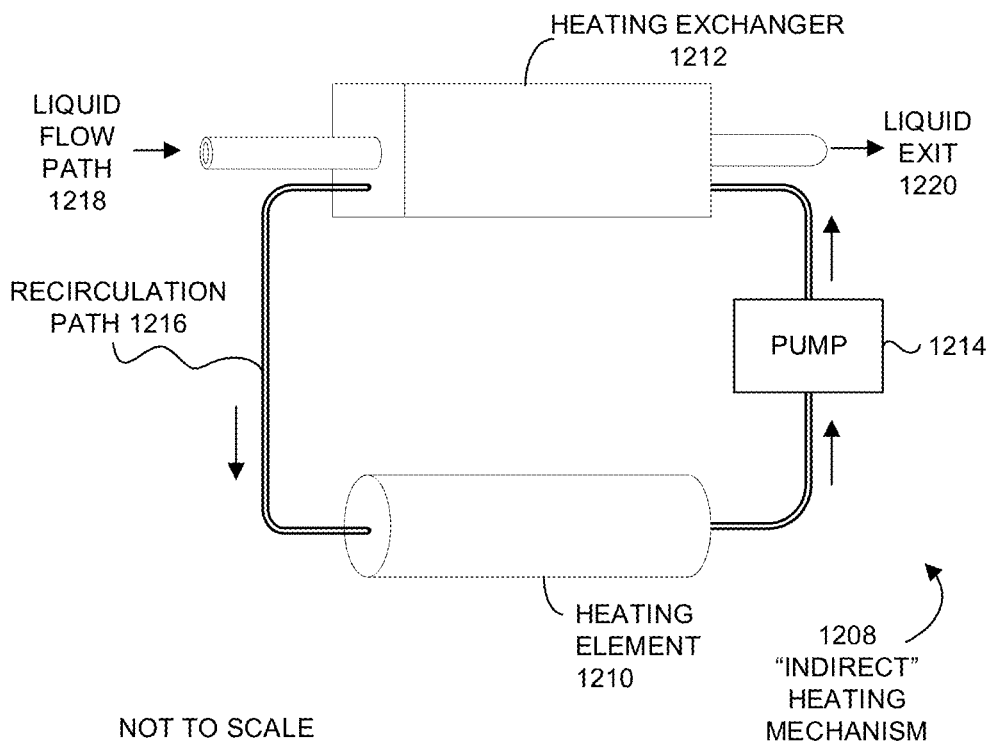
FIG. 12B is a diagram illustration of an embodiment showing an "indirect" heating mechanism.

FIG. 12B is an example embodiment 1208 showing an "indirect" heating mechanism. FIG. 12B is not to scale.

Embodiment 1208 may illustrate a heating element 1210 and a heat exchanger 1212. A pump 1214 may cause a heat transfer liquid to flow along a recirculation path 1216. A liquid flow path 1218 may pass through the heat exchanger 1212 and through an exit 1220.

The term "indirect" heating mechanism is used to describe a heating mechanism where heat may be transferred to a recirculating liquid through a heat exchanges and a heat transfer liquid, as opposed to a "direct" heating mechanism where the heat may be applied without the intermediate heat transfer liquid.

Figure 13:
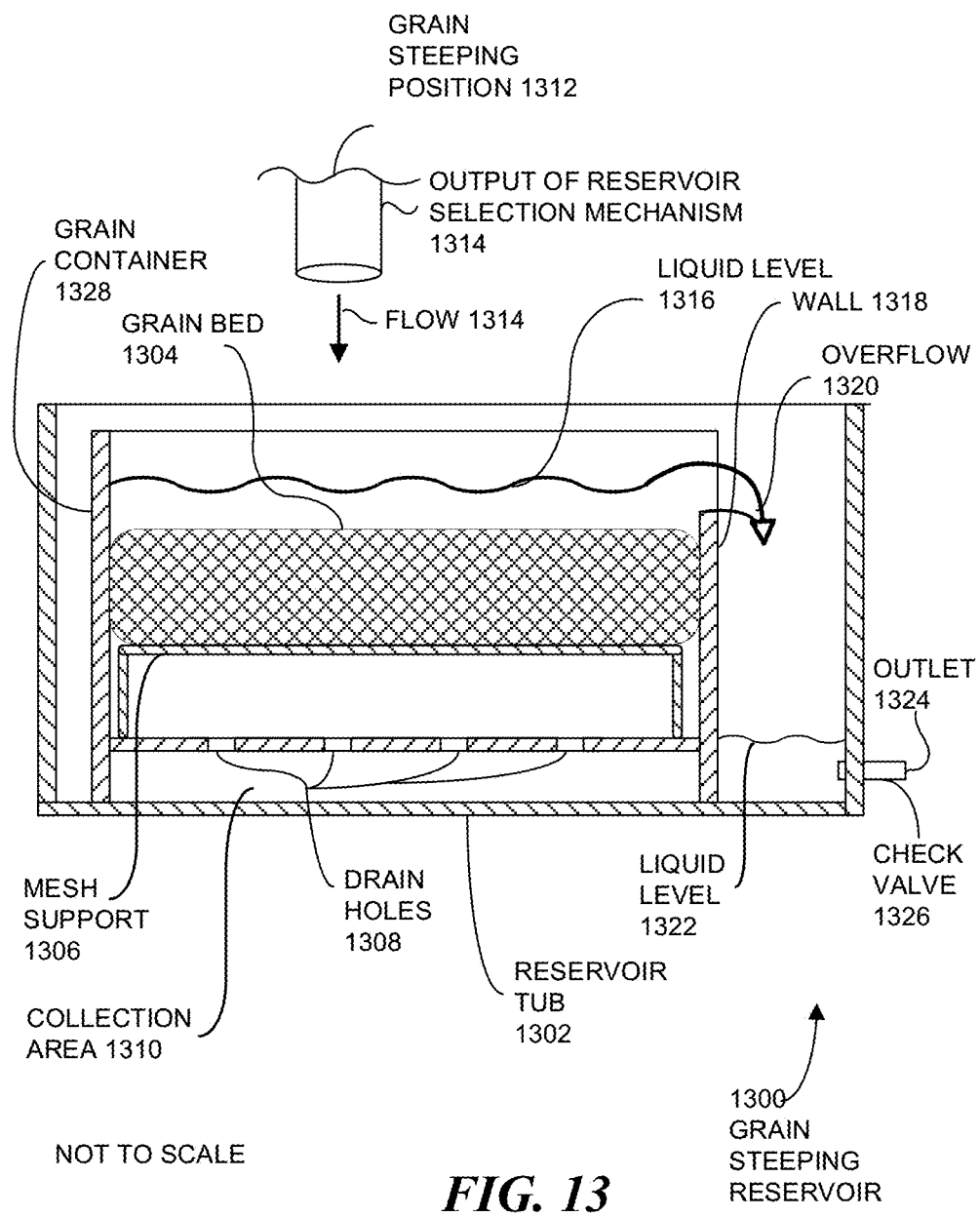
FIG. 13 is a diagram illustration of an embodiment showing a cross-section of a grain steeping reservoir.

FIG. 13 is an example embodiment 1300 showing a grain steeping reservoir. FIG. 13 is not to scale.

Embodiment 1300 illustrates one example design of a grain steeping reservoir where an overflow may be used to pass recirculated liquid through a grain bed 1304.

The reservoir tub 1302 may be a large container which may contain smaller containers. The smaller containers may be individually or collectively removable, or may be molded as one unit. In some cases, two or more containers may be joined together into a single unit, which may be removable from the reservoir tub 1302.

A grain container 1328 may have a grain bed 1304 that may be supported by a mesh support 1306. The mesh support 1306 may retain the grain particles from leaving the container and possibly clogging downstream piping or equipment. Liquid in the grain bed 1304 may pass through drain holes 1308 into a collection area 1310.

A reservoir selection mechanism may have an output 1314 that may position an output at a grain steeping position 1312. The flow 1314 may drop recirculated liquid into the grain container 1328.

The flow 1314 may be higher than the amount of liquid that may pass through the drain holes 1308, causing a liquid level 1316 to exceed a wall 1318 and causing an overflow 1320. The overflow 1320 may bypass the grain bed 1304, and the grain bed 1304 may remain wetted.

In some cases, the inlet pump may be controlled to fill the grain container 1328 and maintain the liquid level 1316 above the grain bed. Such a system may use a sensor to determine the liquid level 1316, and may increase or decrease the flow 1314 to maintain a minimum liquid level 1316. Some such systems may or may not use an overflow system.

The overflow 1320 may pass into an area that may be used for a bypass flow path. In a bypass flow path, the output of the reservoir selection mechanism 1314 may be positioned over the overflow area such that the liquid may recirculate without passing through any of the various reservoirs.

The output of the drain holes 1308 and the overflow 1320 may collect in the bottom of the grain reservoir 1302, creating a liquid level 1322. The outlet 1324 may draw the liquid out of the grain reservoir 1302 and through a check valve 1326.

Figure 14:
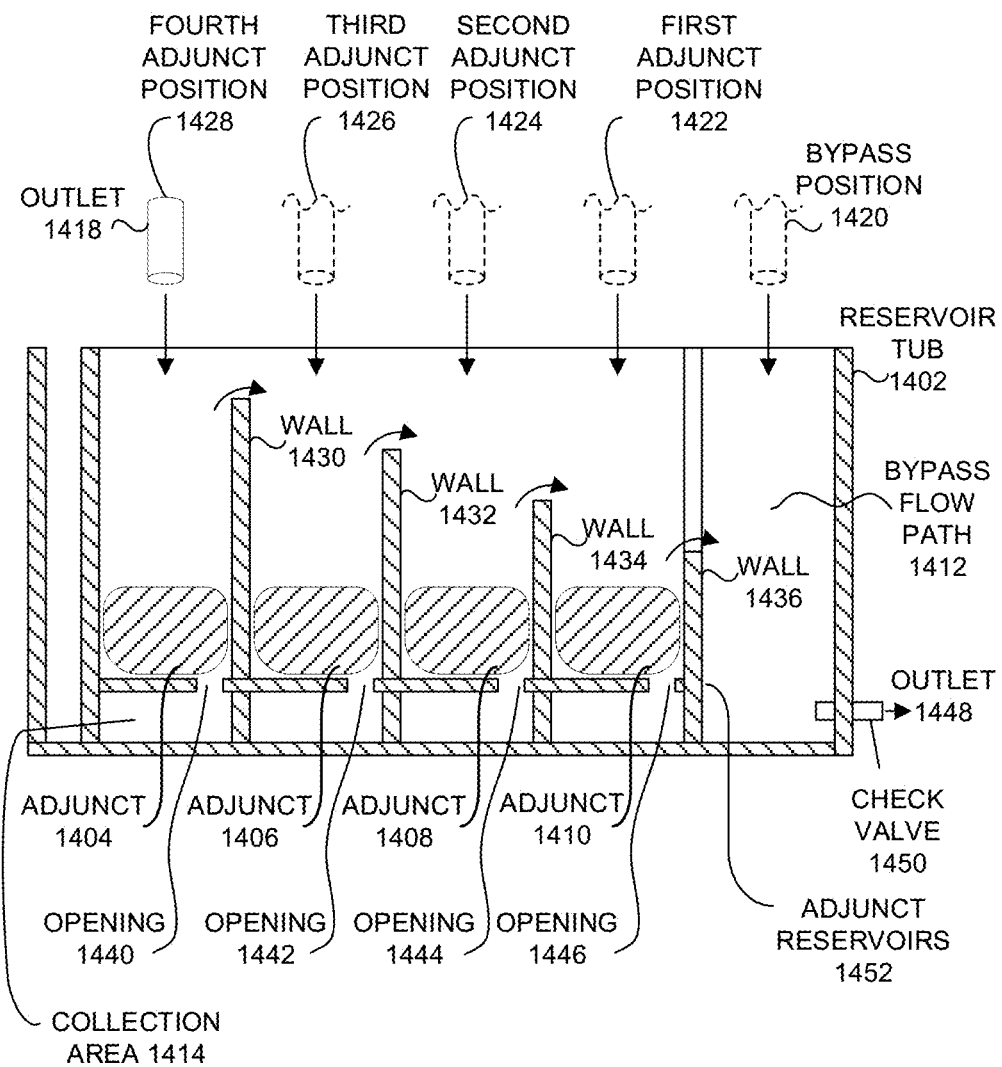
FIG. 14 is a diagram illustration of an embodiment showing a series of adjunct steeping reservoirs.

FIG. 14 is a diagram illustration of an embodiment 1400 showing an example cross-section of a set of adjunct steeping reservoirs. FIG. 14 is not to scale.

FIG. 1400 is merely one example of a cascading flow reservoir where multiple hops or adjuncts may be added to a flow path in a sequence.

The reservoir tub 1402 may have reservoirs for adjuncts 1404, 1406, 1408, and 1410. Each of the reservoirs may have openings 1440, 1442, 1444, and 1446, respectively.

The reservoir tub 1402 may be a larger container into which removable containers may be placed. The larger container of the reservoir tub 1402 may be removable from a brewing device as a single unit, such that a user may load the reservoir tub 1402 with the various ingredients into a brewing device. The reservoir tub 1402 may contain multiple ingredient reservoirs, some of which may be removable from the reservoir tub 1402 individually or joined to other ingredient reservoirs.

In the example of embodiment 1400, the reservoir tub 1402 may be one piece, which the adjunct reservoirs 1452 may be a second, separate piece, which may be removable from the reservoir tub 1402. In such an embodiment, the reservoir tub 1402 may form a collection area 1414 which may collect liquid as the liquid passes through one or more of the various reservoirs that may be in the reservoir tub 1402.

A reservoir selection mechanism may be configured to move an outlet 1418 into multiple positions over the reservoir 1402. The positions may include a bypass position 1420, a first adjunct position 1422, a second adjunct position 1424, a third adjunct position 1426, and a forth adjunct position 1428.

In the bypass position 1420, liquid may flow through a bypass flow path 1412 and through a check valve 1450 to an outlet 1448.

In the first adjunct position 1422, flow may drop into the adjunct 1410 and through an opening 1446. When inlet flow exceeds the flow through the opening 1446, an overflow may occur across the wall 1436.

In the second adjunct position 1424, flow may drop into the adjunct 1408 and through an opening 1444. The incoming flow may exceed the flow through the opening 1444, causing an overflow across wall 1434 and into the adjunct 1410.

In the third adjunct position 1426, flow may drop into the adjunct 1406 and through an opening 1442. The incoming flow may exceed the flow through the opening 1444, causing an overflow across wall 1432 and into the adjunct 1408. When the incoming flow exceeds the flow through openings 1442 and 1444, the flow may overflow wall 1434 and into the adjunct 1410.

In the fourth adjunct position 1428, flow may drop into the adjunct 1404 and through an opening 1440. The incoming flow may exceed the flow through the opening 1440, causing an overflow across wall 1430 and into the adjunct 1406. When the incoming flow exceeds the flow through openings 1440 and 1442, the flow may overflow wall 1432 and into the adjunct 1408. When the incoming flow exceeds the flow through openings 1440, 1442, and 1444, the flow may overflow wall 1434 and into the adjunct 1410.

The series of adjunct reservoirs and overflow walls may enable a process where adjuncts may be added to a cycle in sequence. For example, a first adjunct may be added into a boil sequence at the beginning. At a second point in the boil sequence, the outlet 1418 may be moved to the second adjunct position 1424. During this period, the second adjunct 1408 may begin to be introduced to the liquid, yet the first adjunct 1410 may continue to be steeped by the overflowing liquid.

Such a sequence may replicate a traditional boiling schedule where hops or other adjuncts may be added in sequence to a boil vessel. As the sequence continues, two additional charges of adjuncts may be added at later times.

Embodiment 1400 illustrates an embodiment where four charges of adjuncts may be added to a recirculating system in sequence. Other systems may have more or fewer number of adjunct reservoirs that may be similarly configured.

Figure 15:
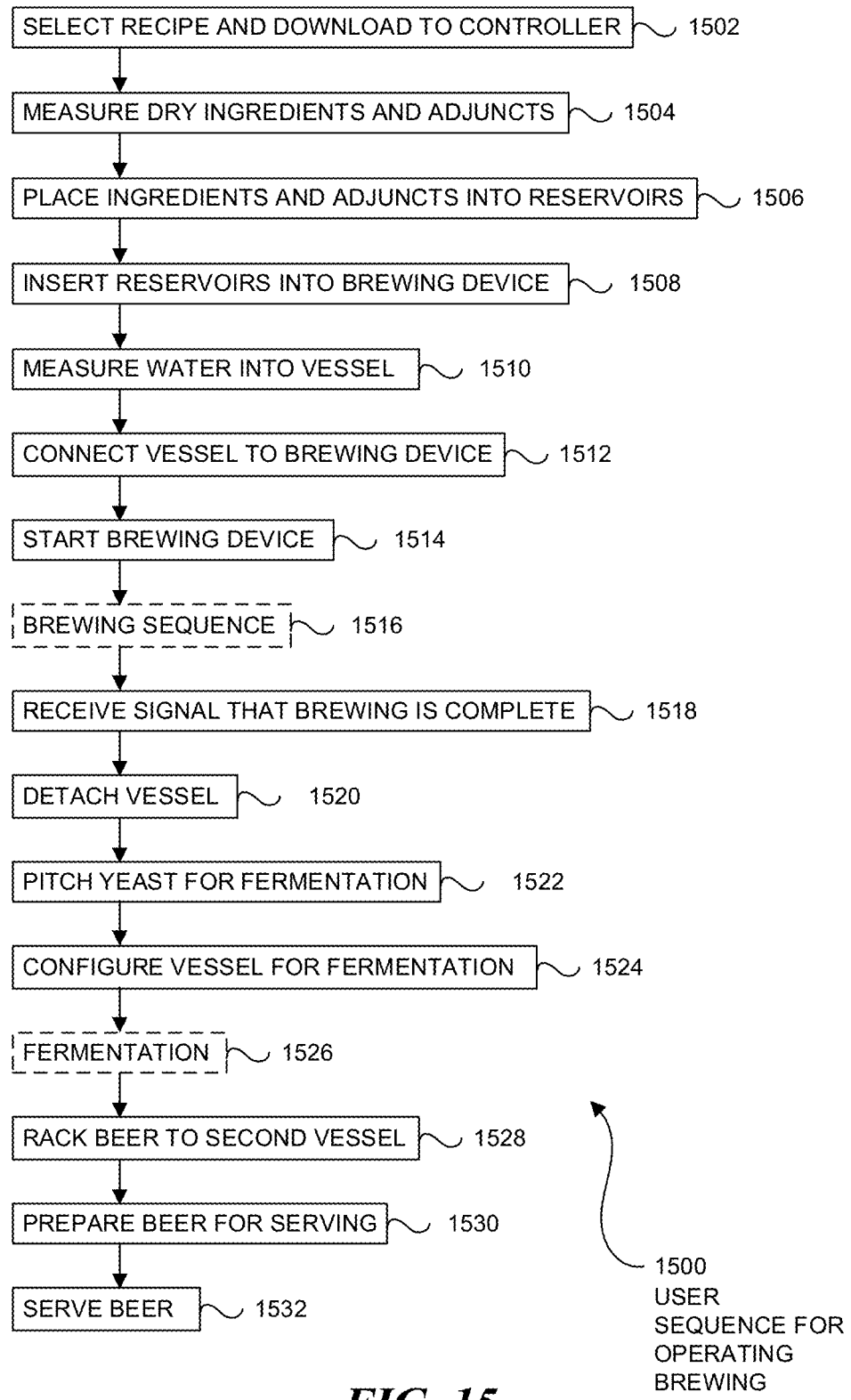
FIG. 15 is a flowchart illustration of an embodiment showing a method for user operations of the brewing device.

FIG. 15 is a flowchart illustration of an embodiment 1500 showing a method performed by a user for operating an automated brewing device. Embodiment 1500 may illustrate one method that may be performed with the device 1002 of embodiment 1000.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 1500 may illustrate the basic steps that a user may perform when using an automated brewing system similar to that described in embodiments 1000 and 1100. The user may start by configuring the device with a recipe, load the brewing device, and start the device. The result of the device's operation may be wort that may be ready for fermentation, and after fermentation, the beer may be prepared for enjoyment.

A user may select a recipe and download the recipe to a controller on the brewing device in block 1502. In some cases, the recipe may be downloaded from a server to the device over a network connection. In other cases, the user may manually program the device to perform a specific recipe.

The recipe may define the brewing sequence, which may include a mashing schedule and boiling schedule. The mashing schedule may define a time and temperature profile that may cause sugars to be extracted from grains that are being steeped. The boiling schedule may define a sequence of hops or other adjuncts and boiling times for which the adjuncts may be steeped.

The dry ingredients may be measured in block 1504. The dry ingredients may include grains, such as malted barley, rice, corn, oats, or other grains and cereals that may be processed during a mashing phase, as well as different charges of hops or other adjuncts that may be added during a boil phase.

The ingredients may be added to various reservoirs in block 1506 and inserted into the device in block 1508.

Water may be measured and added to a vessel in block 1510, and the vessel may be connected to the device in block 1512.

The brewing device may be started in block 1514, and the device may execute a brewing sequence in block 1516. When the brewing sequence is complete, the user may receive a signal in block 1518.

The user may detach the vessel in block 1520, pitch yeast for fermentation in block 1522, and configure the vessel for fermentation in block 1524. The configuration may include adding an airlock to the vessel. The fermentation may occur in block 1526.

Once fermentation is complete, the beer may be racked from one vessel to another in block 1528. Racking may be performed to remove the beer from the yeast in many cases. The beer may be prepared for serving in block 1530, which may involve bottling the beer or pressurizing a serving vessel with carbon dioxide or other gas for carbonation. Lastly, the beer may be enjoyed in block 1532.

Figure 16:
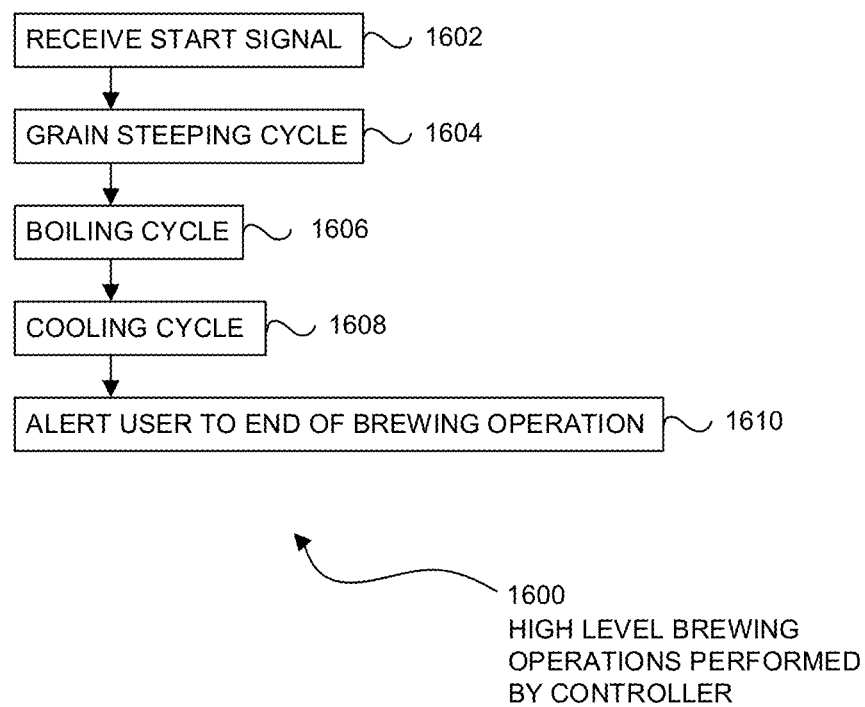
FIG. 16 is a flowchart illustration of an embodiment showing a method for operations of a brewing device.

FIG. 16 is a flowchart illustration of an embodiment 1600 showing a high level method performed by a brewing device. The overall sequence may be presented in embodiment 1600, and subsequent figures may describe these sequences in more detail.

The sequence of operations of a brewing device may follow a traditional wort manufacturing process. A start signal may be received in block 1602. A grain steeping cycle or mashing cycle may be performed in block 1604, followed by a boiling cycle in block 1606, a cooling cycle in block 1608, and the device may alert the user to the completion in block 1610.

Figure 17:
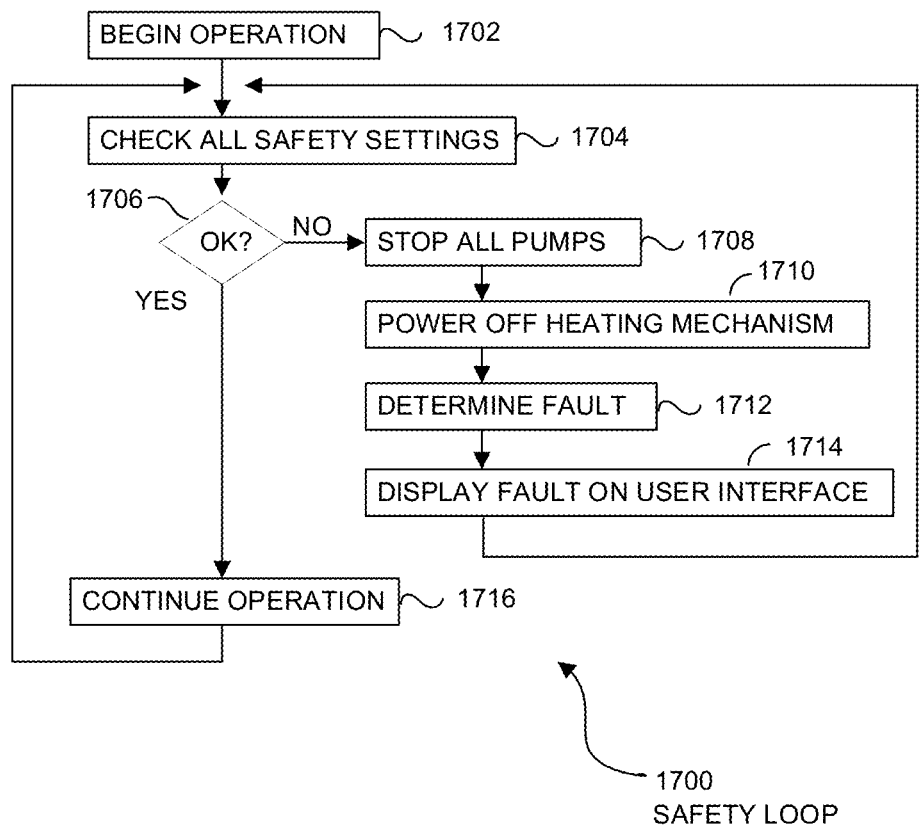
FIG. 17 is a flowchart illustration of an embodiment showing a safety loop operation of a brewing device.

FIG. 17 is a flowchart illustration of an embodiment 1700 showing a safety loop that may be performed by a brewing device throughout the operational stages of brewing. Embodiment 1700 may be a simplified version of a loop that may check safety settings and, if an error is detected, may halt operations.

Operations may begin in block 1702.

All of the safety settings may be checked in block 1704. If the safety settings are OK in block 1706, the operations of the brewing system may continue in block 1716.

The safety settings may vary from one embodiment to another. In general, the safety settings may be selected to reduce the risk of damage to users, the equipment, or to the wort being produced. Some systems may have inherent designs that may minimize scalding injuries, damage to the equipment, or other problems. In many cases, safety settings may be determined by sensors, switches, or other inputs.

When safety settings are not OK in block 1706, all pumps may be stopped in block 1708 and heating mechanisms may be powered off in block 1710. Such operations may prevent scalding if hot liquids are present, or may prevent damage to the equipment.

A fault may be determined in block 1712 and the fault may be displayed on an interface in block 1714 to alert a user. The fault detection and display may be a fault that may be rectified by the user, such as repositioning a removable reservoir. In some cases, the fault may be a fault that may cause a brewing batch to be discarded, such as a fault in a heating mechanism.

The safety loop of embodiment 1700 may be performed while the brewing device is in operation, including while the mashing cycle and boiling cycle are being performed.

Figure 18:
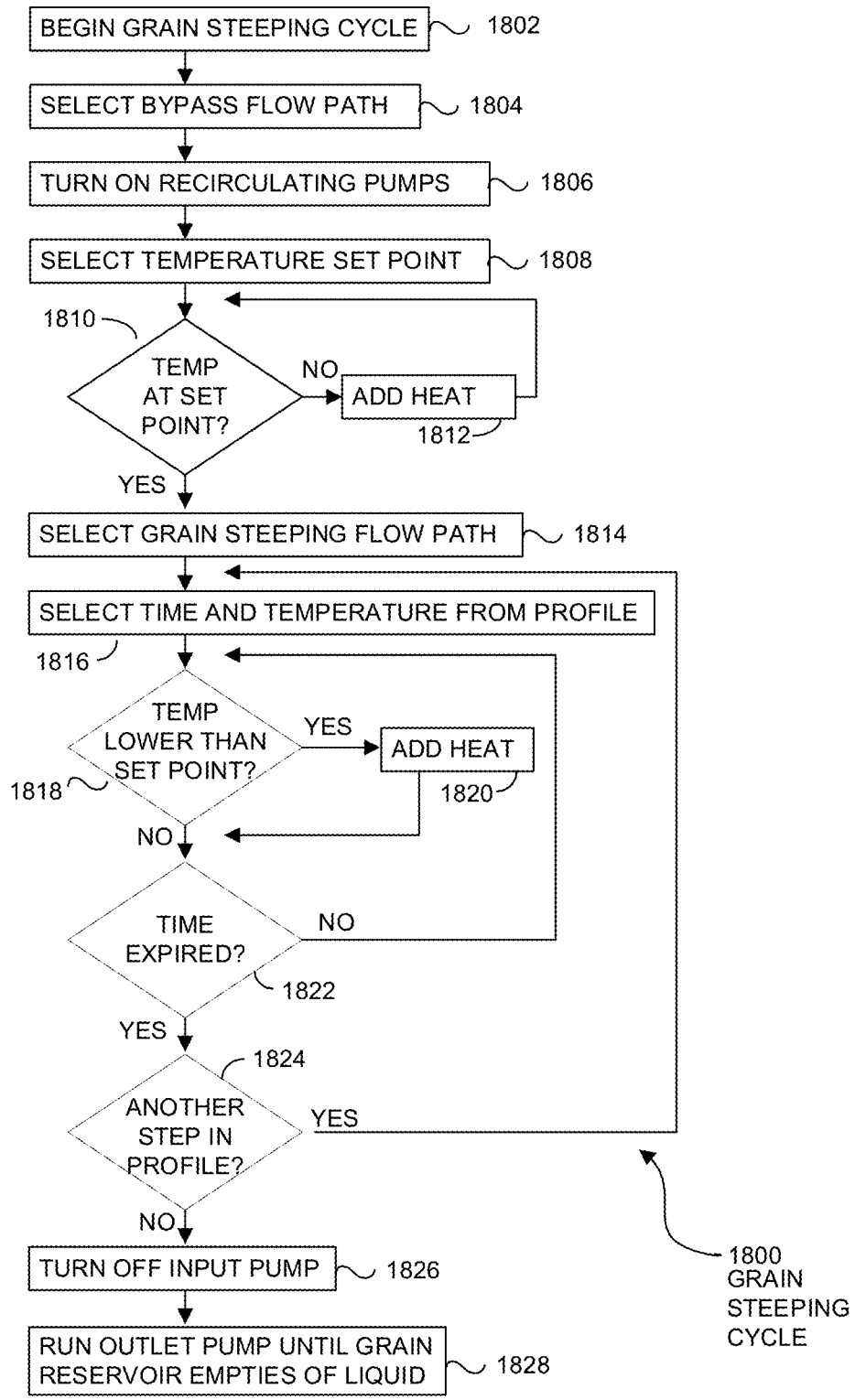
FIG. 18 is a flowchart illustration of an embodiment showing a method for a grain steeping cycle of an automated brewing device.

FIG. 18 is a flowchart illustration of an embodiment 1800 showing a grain steeping cycle or mashing cycle. The mashing cycle may cause sugars to be extracted from a grain bed.

The mashing cycle may be defined by a time and temperature profile. A single-step infusion mash profile may have a first temperature set point which may be held for a period of time. In a typical sequence, the temperature may be in the range of 165 deg F. and hold for 90 minutes. A more complex mashing sequence may start at one temperature, hold for a predetermined amount of time, move to a second temperature, hold for a second amount of time, and continue for several additional temperatures and time.

The mashing profile may be defined differently for different types of beers. Each mashing profile may cause different types of sugars to be extracted from the grains, and those sugars may affect the flavor profile of the finished beer.

The mashing profile may be part of the recipe that may be downloaded to a programmable controller in a brewing device. The programmable controller may turn on and off a heating mechanism to raise, lower, or maintain a temperature of the liquid, as well as control the various pumps and select bypass flow paths or one of the various reservoir flow paths during operations.

The grain steeping cycle may begin in block 1802.

The bypass flow path may be selected in block 1804. Recirculating pumps may be started in block 1806 and a first temperature start point may be selected in block 1808.

As the recirculating and heating may continue, if the temperature is not at a set point in block 1810, heat may be added in block 1812. Once the temperature reaches the set point in block 1810, the grain steeping flow path may be selected in block 1814. At this point, the mashing may begin as the grains become wetted.

A time and temperature may be determined from the mashing profile in block 1814.

If the temperature is below the set point in block 1818, heat is added in block 1820. If the time has not expired in block 1822, the process may return to block 1818.

When the time has expired for the step in the mashing profile and another step remains in the profile in block 1824, the process may return to block 1816 to select the next time and temperature setting from the profile.

When all of the steps have been completed in block 1824, the input pump may be turned off in block 1826 and the outlet pump may continue to run in block 1828 until the grain reservoir empties.

Figure 19:
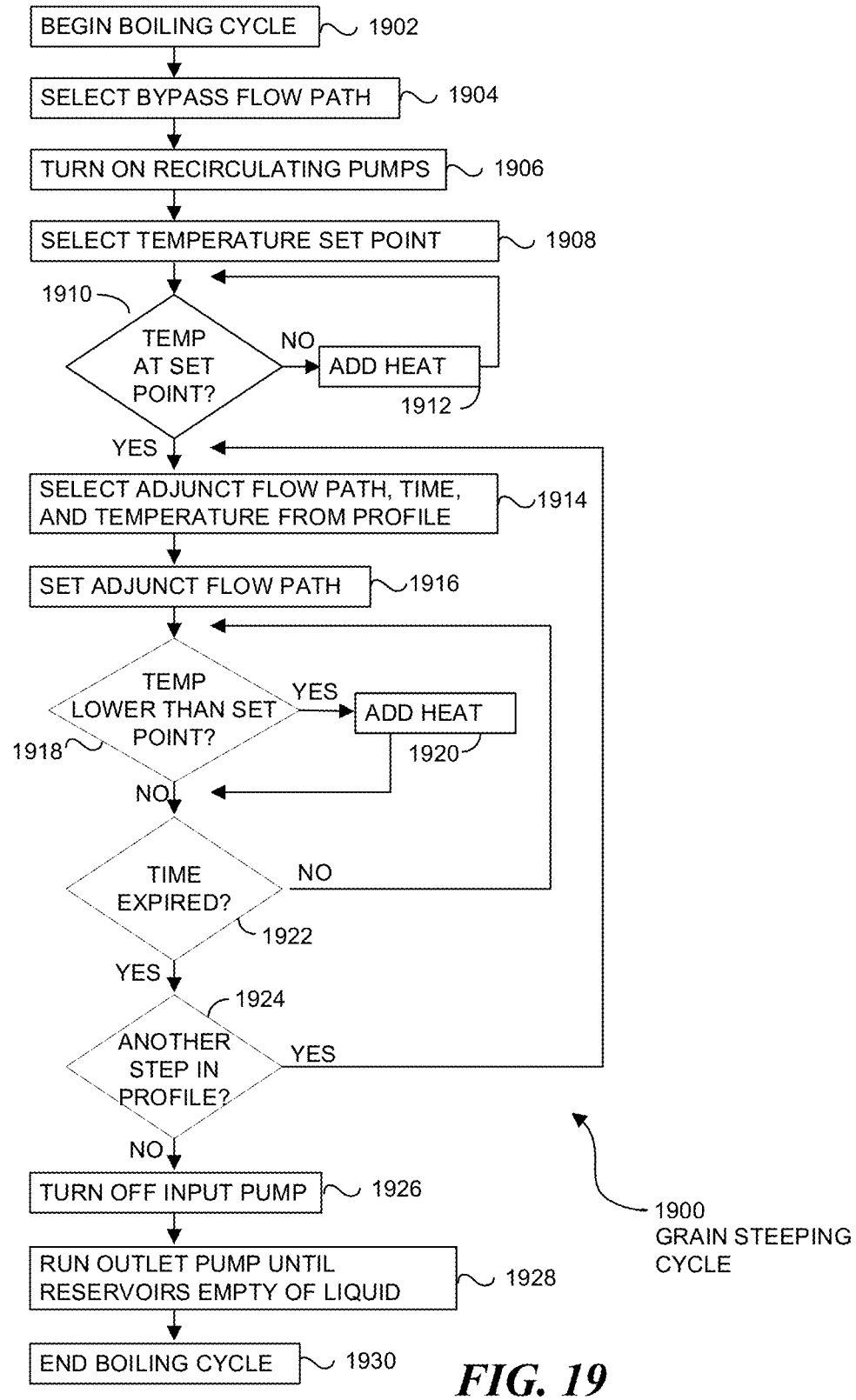
FIG. 19 is a flowchart illustration of an embodiment showing a method for a boiling cycle of an automated brewing device.

FIG. 19 is a flowchart illustration of an embodiment 1900 showing a boiling cycle. The boiling cycle may be performed at or near the boiling temperature and may further change the extracted sugars into fermentable sugars. During the boil cycle, hops and other adjuncts may be added in sequence.

The boiling cycle may be defined by a boiling profile, which may include definitions for an adjunct flow path, as well as time and temperature settings for each step in the boiling cycle.

The boiling cycle may begin in block 1902.

The bypass flow path may be selected in block 1904. The recirculating pumps may be turned on in block 1906 and a temperature set point may be determined in block 1908. In a typical boiling cycle, the first set point may be close to boiling, and may vary depending on altitude or atmospheric pressure. As the liquid recirculates, if the temperature is not at the set point in block 1910, heat may be added in block 1912.

Once the temperature reaches the set point in block 1910, the adjunct flow path, time, and temperature may be selected from the profile in block 1914.

The adjunct flow path may be set in block 1916. While liquid recirculates through the set adjunct flow path, if the temperature is lower than the set point in block 1918, heat may be added in block 1920. If time has not expired for the profile step, the process may return to block 1918.

Once time has expired on the boiling step and another step exists in the profile in block 1924, the process may return to block 1914 to determine and execute the next step in the profile.

If all the steps have been completed in block 1924, the input pump may be turned off in block 1926. The outlet pump may continue to run in block 1928 until the reservoirs empty. The boiling cycle may end in block 1930.

Figure 20:
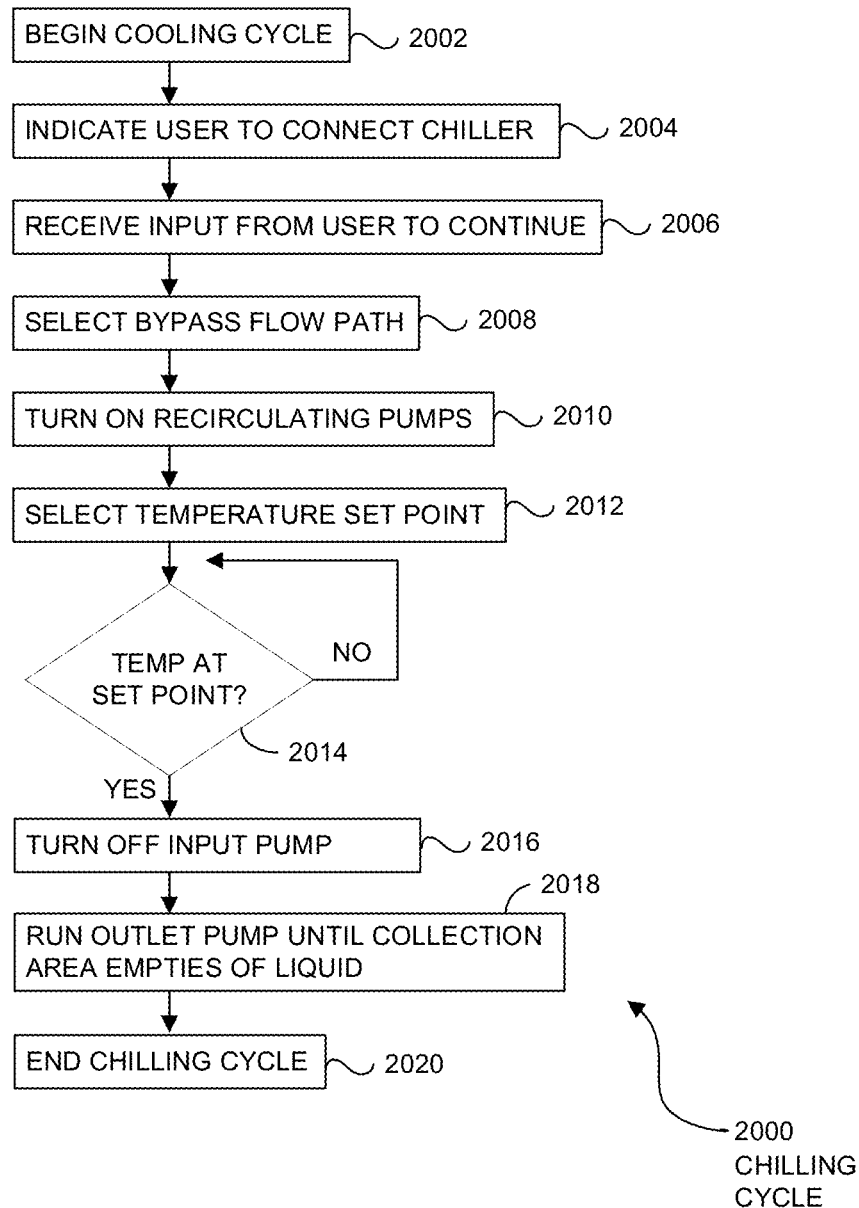
FIG. 20 is a flowchart illustration of an embodiment showing a method for a chilling cycle of an automated brewing device.

FIG. 20 is a flowchart illustration of an embodiment 2000 showing a chilling cycle. In embodiment 2000, the chilling cycle may use an external chiller that may be manually attached to the system.

Other systems may have internal chillers that may not have a user install the chiller.

The cooling cycle may begin in block 2002.

A user may be alerted in block 2004 to install a heat exchanger or other chilling mechanism. The user may send an input in block 2006 to the controller to continue once the chilling mechanism may be installed.

The bypass flow path may be set in block 2008. The recirculating pumps may be turned on in block 2010. A temperature set point may be selected in block 2012.

The recirculation may continue through the cooling mechanism. If the temperature is above the set point in block 2014, the recirculation may continue in block 2014.

Once the set point has been reached in block 2014, the input pump may be turned off in block 2016. The outlet pump may be run in block 2018 until the collection area empties. The chilling cycle ends in block 2020.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

The invention claimed is:

1. A system comprising:
a computer controlled brewing system comprising:
a recirculating infusion mash system having a recirculating boiling flow path;
a plurality of hops addition flow paths;
a hardware platform comprising a computer processor;
a control system executing on said hardware platform and configured to:
receive a performance model of said computer controlled brewing system;
receive a recipe, said recipe comprising a series of brewing steps, each of said brewing steps comprising a time parameter and a temperature parameter, at least one of said brewing steps being part of a mashing schedule, said recipe comprising a desired gravity;
receive a first measured parameter during a brewing session, said first measured parameter being measured at a first point during said brewing session;
determine an expected value for said first measured parameter at said first point of said brewing session;
determine a difference between said first measured parameter and said expected value;
calculate at least one updated brewing step, said at least one updated brewing step being calculated using said difference and said performance model; and
cause said computer controlled brewing system to execute said brewing session with said at least one updated brewing step;
said performance model being trained based on a plurality of brewing sessions on brewing systems with incorrectly configured hoses and said difference indicating an incorrect configuration of said computer controlled brewing system.

2. The system of claim 1, said first measured parameter being amount of heat added during a first brewing step.

3. The system of claim 2, said first brewing step being a grain addition step.

4. The system of claim 1, said first measured parameter being a specific gravity measurement.

5. The system of claim 4, said mashing schedule comprising a first step and a last step, said first measured parameter being taken before said last step in said mashing schedule.

6. The system of claim 5, said at least one updated brewing step being a change to said mash schedule calculated to achieve a desired gravity.

7. The system of claim 6, said at least one updated brewing step comprising changing a length of time for at least one of said brewing steps.

8. The system of claim 1, said at least one updated brewing step comprising halting said brewing session based on said difference.

9. The system of claim 8, said first measured parameter being a rate of change for temperature.

* * * * *